(12) United States Patent
Laroche et al.

(10) Patent No.: US 10,535,162 B2
(45) Date of Patent: Jan. 14, 2020

(54) ATTRIBUTE MAPPING TO ENCODE AND DECODE 3D MODELS

(71) Applicant: CANON KABUSHIKI KAISHA, Tokyo (JP)

(72) Inventors: Guillaume Laroche, Saint Aubin d'Aubigne (FR); Patrice Onno, Rennes (FR); Christophe Gisquet, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 15/855,352

(22) Filed: Dec. 27, 2017

(65) Prior Publication Data

US 2018/0189982 A1 Jul. 5, 2018

(30) Foreign Application Priority Data

Jan. 2, 2017 (GB) .................................. 1700025.8

(51) Int. Cl.
*G06T 9/20* (2006.01)
*G06T 9/40* (2006.01)

(52) U.S. Cl.
CPC . *G06T 9/20* (2013.01); *G06T 9/40* (2013.01)

(58) Field of Classification Search
CPC .............. G06T 9/20; G06T 9/001; G06T 9/40
See application file for complete search history.

(56) References Cited

U.S. PATENT DOCUMENTS

| | | | |
|---|---|---|---|
| 2003/0214502 A1 | 11/2003 | Park | |
| 2011/0037763 A1* | 2/2011 | Lee | G06T 9/001 345/419 |
| 2012/0163456 A1* | 6/2012 | Coban | H04N 19/176 375/240.13 |

FOREIGN PATENT DOCUMENTS

| | | | |
|---|---|---|---|
| EP | 1321893 A2 | 6/2003 | |
| EP | 1321894 A2 | 6/2003 | |

OTHER PUBLICATIONS

Karthik Ainala, et al. An Improved Enhancement Layer for Octree Based Point Cloud Compression With Plane Projection Approximation, Applications of Digital Image Processing XXXIX, Proceedings of the SPIE, vol. 9971, 2016.

Official Communication Letter issued for GB 1700025.8 (Publication No. GB2558314), dated Jan. 21, 2019.

Rufael Mekuria, et al., "Design, Implementation, and Evaluation of a Point Cloud Codec for Tele-Immersive Video", IEEE Transactions on Circuits and Systems for Video Technology, vol. 27, Issue 4, pp. 828-842, Apr. 2017.

\* cited by examiner

*Primary Examiner* — Chong Wu
(74) *Attorney, Agent, or Firm* — Canon U.S.A., Inc. IP Division

(57) ABSTRACT

Encoding and decoding of property data, such as colour values, associated with vertices forming 3D objects. From an analysis of connectivity data, a spiral-like scanning path of the vertices within the 3D model is obtained. The colour values are mapped to a 2D image, each attribute value to a pixel. Next, the mapped 2D image is encoded. To increase redundancies in the 2D image, the spiral-like path is split into path segments, each forming a turn in the spiral; each path segment is assigned to a respective line of the 2D image; and the colour values of each path segment are mapped, in the same order, to the respective line of the 2D image. Successive lines in the 2D image thus contain the colour values of neighbouring vertices in the 3D object, and a better encoding can be achieved.

18 Claims, 21 Drawing Sheets

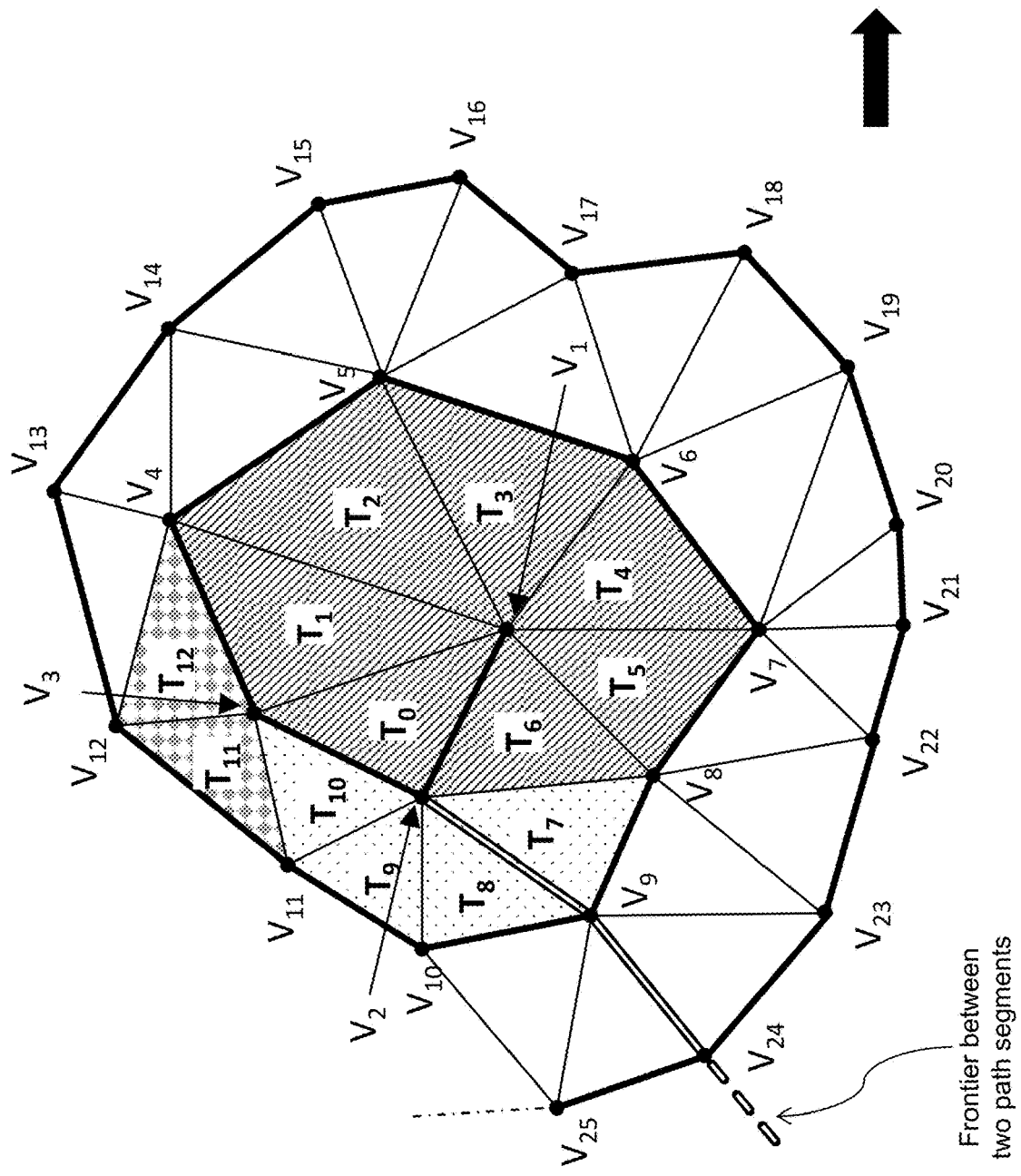

ATTRIBUTE MAPPING TO ENCODE AND DECODE 3D MODELS

This application claims the benefit under 35 U.S.C. § 119(a)-(d) of United Kingdom Patent Application No. 1700025.8, filed on 2 Jan. 2017 and entitled "IMPROVED ATTRIBUTE MAPPING TO ENCODE AND DECODE 3D MODELS". The above cited patent application is incorporated herein by reference in its entirety."

FIELD OF THE INVENTION

The present invention relates generally to the encoding of three-dimensional (3D) objects, and more specifically to methods and devices for encoding, into a bitstream, 3D models made of a plurality of points, for instance connected vertices forming triangles, and for decoding such bitstream. The present invention focuses on the encoding of property data, such as colour attributes.

BACKGROUND OF THE INVENTION 3D models are made of geometrical entities.

3D models may be made of a cloud of points. However, more common 3D models are 3D mesh models composed of polygons, e.g. triangles, between connected points, also denoted vertices.

Typically, 3D meshes are represented by three types of data: connectivity data, geometry data and property data, usually stored in one or more files in memory. Connectivity data describe the adjacency relationship, if any, between the vertices composing the triangles, while geometry data specify vertex locations or positions, and property data specify attributes such as the normal vector per vertex or face, a colour per vertex or face, material reflectance and texture per face. Most 3D compression algorithms compress connectivity data and geometry data separately.

One known compression algorithm to encode the connectivity data is the Scalable Complexity 3D Mesh Compression-Triangle-Fan (SC3DMC-TFAN) approach of the MPEG Group, for instance as described in publication "*A Triangle-FAN-based approach for low complexity 3D mesh compression*" (Mamou K., Zaharia T., Preteux F., IEEE International Conference on Image Processing, 2009).

SC3DMC-TFAN includes traversing successively each vertex constituting the 3D mesh model; and for each vertex successively traversed, performing a triangle-based fan (T-FAN) analysis centred on the traversed vertex (i.e. one vertex of the triangles considered in the fan is the traversed vertex) to discover any new triangle not yet discovered when traversing the previous vertices, and determining (TFAN) connectivity data between vertices based on the newly discovered triangle or triangles. The T-FAN analysis makes it possible to obtain triangle-based fan portions, each made of a contiguous series of newly discovered triangle or triangles.

The fan portions and other data are encoded as connectivity data.

SC3DMC standard defines six encoding methods to encode the geometry data.

Most efficient known algorithms to encode the geometry data, i.e. point or vertex positions, are based on connectivity-based geometry prediction.

The main idea of this approach method is to use the connectivity between the vertices (i.e. the connectivity data) to generate a geometry predictor. One known method of the connectivity-based geometry prediction is the parallelogram predictor described for instance in publication "*Triangle mesh compression*" (Touma C. and Gotsman C., Proceedings of the 1998 Graphics Interface Conference, p. 26-34, 1998).

SC3DMC standard also provides that the attributes forming the property data are encoded using one of the same six defined encoding methods, including the parallelogram predictor. However, the most efficient one seems to be the so-called "Circular Differential" method wherein the attribute value is predicted by the last encoded colour value and the predicted value is modified if it exceeds a maximum size. In this example, the colour values are defined at vertex or point level, meaning that the 3D object contains an RGB colour for each vertex (or point).

Other attribute (e.g. colour) representations can be used, such as setting an attribute per face when the 3D object is a mesh, meaning that for each face the 3D object contains its related attribute value (e.g. RGB colour). Finally, an attribute can also be set for each edge of a face (e.g. a triangle).

Another known coding method of colour-per-point values is described in "*Design, Implementation and Evaluation of a Point Cloud Codec for Tele-Immersive Video*" (Rufael Mekuria et al., 2016, IEEE Transactions on Circuits and Systems for Video Technology). The described method is dedicated to the point cloud compression, and proposes a lossy colour attribute coding based on the JPEG standard.

To achieve that, the colour-per-point values are mapped to a 2D image. In details, the coordinates of the points are first coded in an octree structure. The latter can then be used to drive the mapping. In particular, the colour values are mapped to 8×8 blocks in the 2D image based on the depth first octree traversal, thereby defining a scanning order of the points. The colour values successively considered according to the scanning order are mapped to pixels of the blocks using a "zigzag pattern" as depicted in FIG. 8.

The resulting mapped 2D image is then encoded using a legacy JPEG codec.

The improved coding efficiency would allegedly result from the fact that in the depth first traversal subsequent pixels are often co-located.

However, the obtained coding efficiency is not satisfactory. More efficient methods for encoding or decoding attribute values in 3D objects, either point clouds or mesh objects, are thus searched.

SUMMARY OF INVENTION

The inventors have noticed that the known techniques do not take advantage enough of correlations between points or vertices forming the 3D objects.

On the basis of this finding, the inventors propose new approaches.

First embodiments of the invention thus provide a method of encoding, into a bitstream, a three-dimensional model made of vertices (i.e. points), the method comprising the following steps:
  obtaining a spiral-like scanning path of vertices within the 3D model,
  mapping values of a given attribute taken by the scanned vertices, to a 2D image, the attribute value of each scanned vertex being represented by a pixel in the 2D image, wherein the mapping:
    splits the spiral-like scanning path to obtain a plurality of path segments,
    assigns path segments to respective lines or columns of the 2D image, and maps the attribute values of consecutive vertices of the path segments to consecutive pixels of the respectively assigned lines or columns; and encoding, using an image or video encoder, the mapped 2D image into a bitstream.

Correspondingly, the first embodiments of the invention provide a method of decoding, from a bitstream, a three-dimensional model made of vertices (i.e. points), the method comprising the following steps:

obtaining a spiral-like scanning path of vertices within the 3D model, decoding, using an image or video decoder, the bitstream into a 2D image, and mapping pixels forming the 2D image to values of a given attribute taken by the scanned vertices, the attribute value of each scanned vertex being represented by a pixel in the 2D image, wherein the mapping:

splits the spiral-like scanning path to obtain a plurality of path segments, assigns path segments to respective lines or columns of the 2D image, and maps consecutive pixels of lines or columns of the 2D image to attribute values of consecutive vertices of the respectively assigned path segments.

The obtained path is defined within the envelope of the 3D model/object.

Improved coding efficiency of the 2D image is obtained in the first embodiments.

This is achieved thanks to the split of the spiral like path into path segments. Indeed, as long as path segments are suitably chosen, the vertices having substantially the same position in two consecutive path segments are neighbours in the 3D model.

The segment-path-based mapping thus ensures the lines (or columns) of the 2D image to keep small spatial distances from the 3D model. The split and mapping thus keeps correlation between vertices of the 3D model, in such a way an efficient encoding of the 2D image can be achieved.

From a device point of view, the first embodiments of the invention provide a device for encoding, into a bitstream, a three-dimensional model made of vertices, the device comprising at least one microprocessor configured for carrying out the following steps:

obtaining a spiral-like scanning path of vertices within the 3D model, mapping values of a given attribute taken by the scanned vertices, to a 2D image, the attribute value of each scanned vertex being represented by a pixel in the 2D image, wherein the mapping:

splits the spiral-like scanning path to obtain a plurality of path segments, assigns path segments to respective lines or columns of the 2D image, and maps the attribute values of consecutive vertices of the path segments to consecutive pixels of the respectively assigned lines or columns; and encoding, using an image or video encoder, the mapped 2D image into a bitstream.

Also, the first embodiments of the invention provide a device for decoding, from a bitstream, a three-dimensional model made of vertices, the device comprising at least one microprocessor configured for carrying out the following steps:

obtaining a spiral-like scanning path of vertices within the 3D model, decoding, using an image or video decoder, the bitstream into a 2D image, and mapping pixels forming the 2D image to values of a given attribute taken by the scanned vertices, the attribute value of each scanned vertex being represented by a pixel in the 2D image, wherein the mapping:

splits the spiral-like scanning path to obtain a plurality of path segments, assigns path segments to respective lines or columns of the 2D image, and maps consecutive pixels of lines or columns of the 2D image to attribute values of consecutive vertices of the respectively assigned path segments.

The devices have the same advantages as the methods defined above.

Optional features of the first embodiments of the invention are defined in the appended claims. Some of these features are explained here below with reference to a method, while they can be transposed into system features dedicated to any device according to the first embodiments of the invention.

In embodiments, each path segment substantially corresponds to an integer number of turns within the spiral-like scanning path.

A turn should be understood as about one revolution within the spiral-like path, i.e. a path that turns through about 360 degrees. As the points or vertices in the 3D model are discontinuous in the space, the turn is not generally through exactly 360 degrees. The idea here is to make a turn to be substantially through 360 degrees, meaning the starting and ending points are substantially along the same direction from the central point (starting point) of the spiral-like path. High correlation between two points collocated in two consecutive path segments is thus achieved.

In embodiments, each path segment substantially corresponds to a single entire turn. In this way, neighbour vertices in the 3D model are kept substantially neighbours in the 2D image, therefore increasing correlation within the 2D image. Better encoding is thus achieved.

In embodiments, the method may further comprises sizing the 2D image with a first dimension (height or width) set based on a number of assigned lines or columns and possibly one or more additional lines or columns to map a set of isolated vertices, and with a second dimension (width or height) set based on the maximum length, in terms of number of vertices, of the assigned path segments and possibly of the set of isolated vertices.

The sizing is thus performed after having determined the lengths of the path segments and set of isolated vertices.

Thanks to the above configuration, the vertices of each path segment are kept together in the mapped 2D image. Better correlation-based encoding is thus obtained.

In variants, the method further comprises sizing the 2D image with a first dimension (height or width) set based on a number of assigned lines or columns and possibly one or more additional lines or columns to map a set of isolated vertices, and with a second dimension (width or height) set based on a ratio between the number of scanned vertices having the given attribute and this number of assigned and possible additional lines or columns. Preferably only the assigned lines or columns (i.e. corresponding to one or more turns within the spiral like path) are taken into account in the ratio.

This approach sizes the 2D image to have quite the same number of pixels as the number of attribute values to be encoded. As the 2D image is optimally the smallest one, the amount of data required for coding it is substantially reduced.

According to a specific feature, the first and/or second dimensions are rounded to the nearest greater multiple of a predefined number corresponding to a size of blocks considered by the image or video encoder. For instance, the predefined number is set to 8 (e.g. for JPEG codec) or 16 (e.g. for HEVC codec).

In embodiments, a maximum line size or column size is defined based on the number of vertices in the 3D model. For instance, the maximum line/column size can be set to $4*\sqrt{}$(number of vertices) [square root of the number of vertices]. This approach can be used for point cloud for instance, to appropriately size the 2D image. This is mainly to avoid having too large images without correlation between lines or columns.

In embodiments, the mapped pixels are aligned with the start of the respectively assigned lines or columns, e.g. they are left-aligned in case of lines or top-aligned in case columns are considered for the mapping.

The filling of the 2D image is thus made simple.

In variants, the mapped pixels are centered within their respectively assigned lines or columns, e.g. middle-aligned. A better spatial correlation is thus obtained between the successive lines. Thus improved coding efficiency may be achieved.

In embodiments, the mapping is performed on a 2D image full of pixels initially set with a by-default pixel value. The use of by-default pixel values has two advantages.

On one hand, as the mapped pixels are aligned (either to the left or to the middle of the image), the pixels remaining with the by-default pixel values, if any, are concentrated in the same areas. These homogenous areas can be efficiently encoded.

On the other hand, the decoder may easily parse the received 2D image to obtain the mapped pixels of each line or column.

In some embodiments where the 3D model is a 3D mesh model made of connected vertices and of isolated vertices, additional to the connected vertices, the connected vertices forming triangles with the 3D mesh model, the isolated vertices are mapped to pixels of one or more additional (additional to the lines or columns already assigned to the path segments) lines or columns of the 2D image. As the isolated vertices have no correlation with the connected vertices (forming 3D objects), they can be processed independently without impacting the coding efficiency. From a decoding perspective, pixels of one or more additional (additional to the lines or columns already assigned to the path segments) lines or columns of the 2D image are mapped to attribute values of the isolated vertices.

According to various alternative features, the isolated vertices are each mapped to a pixel of a respective dedicated additional line or column of the 2D image. It means that each isolated vertex has its own line or column. This advantageously decorrelates the isolated vertices one from the other; the isolated vertices are mapped to pixels of one and the same additional line or column of the 2D image. It means a single line or column is obtained for all the isolated vertices. This correlates the isolated vertices among them; the isolated vertices are mapped to pixels of one or more additional lines or columns to fill them completely when possible, the one or more additional lines or columns having a length equal to the maximum length, in terms of number of vertices, of the assigned path segments. The 2D image is thus sized based on the maximum length of the assigned path segments, and additional lines/columns sized accordingly are filled in with the isolated vertices. The size of the 2D image is thus made as small as possible, thereby saving bitrate. The amount of pixels inside the image is consequently closest to the amount of colours per vertex. Moreover, this feature generally reduces the high frequencies between the end of lines or column and the default pixel values. Consequently, it reduces the compressed file size.

Correspondingly, from a decoding perspective, additional lines or columns of the 2D image are dedicated to respective isolated vertices, and a pixel of an additional line or column of the 2D image is mapped to the respective dedicated isolated vertex; pixels of one and the same additional line or column of the 2D image are mapped to the isolated vertices; all pixels of one or more additional lines or columns having a length equal to the maximum length, in terms of number of vertices, of the assigned path segments are mapped to the isolated vertices.

Various rules driving the mapping can be used with specific benefits.

In embodiments, during a first mapping loop, each new path segment is mapped to pixels of a next line or column in the 2D image if the new path segment comprises more vertices having an attribute value than a predefined ratio of the number of attribute values mapped to the last mapped line or column in the 2D image. Otherwise, said new path segment is discarded from the first mapping loop. Preferably, this rule is applied to all the path segments and all the lines/columns successively considered.

From a decoding perspective, during a first mapping loop, pixels of each next line or column in the 2D image are mapped to attribute values of vertices of a new path segment if the new path segment comprises more vertices having an attribute value than a predefined ratio of the number of attribute values mapped to the last processed line or column in the 2D image. Otherwise, said new path segment is discarded and a new one is considered.

According to a specific feature, the predefined ratio is 50%, meaning the next line/column must have at least half the number of attribute values of the previous line/column. Of course other ratio may be used such as 60%, 75% or 80%.

In other embodiments, the method further comprises, during a first mapping loop, truncating at least one path segment of a set of path segments so that the mapping of the attribute values of the vertices remaining in the set of path segments including the truncated path segment matches a N×N block grid in the 2D image. This approach improves coding efficiency when a block-based codec is used.

From a decoding perspective, the method further comprises, during a first mapping loop, identifying lines or columns in the 2D image that have pixels set with attribute values that match a N×N block grid in the 2D image, and mapping all pixels set with attribute values of an identified line or column to the attribute values of a subpart of vertices of a path segment. It means that a path segment has been truncated.

In embodiments, the 2D image has a predefined line or column length, and, during a first mapping loop, the attribute values of the vertices composing each path segment are mapped to pixels of the respectively assigned line or column, until reaching the end of the line or column.

From a decoding perspective, all pixels of a line or column of the 2D image are mapped to the attribute values of a subpart of vertices of the respectively assigned path segment. It means that the path segment has been truncated at the encoder side to match a predefined line or column length.

The attribute values that are not mapped during the first mapping loop can be processed during a second mapping loop.

In embodiments, during a second mapping loop, the attribute values of vertices unmapped during the first mapping loop are mapped to unmapped pixels (i.e. not yet mapped, or remaining with a by-default pixel value) available in the 2D image after the first mapping loop.

This makes it possible to have, at low cost, all the attribute values being encoded.

The unmapped vertices during the first mapping include the unmapped attribute values due to the above predefined ratio, and/or the attribute values of the truncated vertices, and/or the attribute values of the vertices exceeding the line or column length, but also attribute values of isolated vertices that, by nature, do not belong to a spiral-like path.

According to a specific feature, the unmapped pixels are available in lines or columns already mapped during the first mapping loop. This approach avoids adding new lines for the remaining (unmapped) attribute values. As the image size is not increased for those remaining attribute values, the encoding cost of the 2D image is kept low.

According to another feature, the second mapping loop maps unmapped attribute values of vertices to an M×M block (or more) of unmapped pixels in the 2D image. Coding efficiency can thus be increased, in particular when a block-based codec is used.

Preferably, the M×M blocks match the N×N grid mentioned above (e.g. M=N or 2M=N and so on).

According to a specific feature, the second mapping loop maps the unmapped attribute values to an M×M block using a raster scan order, for instance as defined below in the second embodiments of the invention. Thus, all specific sub-embodiments related to the second embodiments may apply.

From a decoding perspective, during the first mapping loop, pixels of a line or column of the 2D image are mapped to the attribute values of all vertices of the respectively assigned path segment, and during a second mapping loop, unmapped pixels set with attribute values are mapped to attribute values of vertices unmapped during the first mapping loop.

According to a specific feature, the second mapping loop maps unmapped pixels forming an M×M block to unmapped attribute values of vertices. For instance, the second mapping loop successively considers the unmapped pixels according to a raster scan order within the M×M block to map them to unmapped attribute values.

In embodiments, obtaining the spiral-like scanning path includes obtaining connectivity data describing connectivity between the vertices within the 3D model and determining a spiral-like scanning path using the connectivity data. This applies to mesh models.

In specific embodiments, the connectivity data define the 3D model with triangles.

In some embodiments, the spiral-like path is discovered/obtained using a neighbouring-based discovery procedure, for instance using a triangle-based fan (T-FAN) analysis.

In other embodiments, the method further comprises encoding connectivity data describing connectivity between the vertices and/or geometry data describing the vertices in the 3D mesh model, by successively considering the vertices according to the spiral-like scanning path.

From a decoding perspective, the method further comprises decoding, from the bitstream, connectivity data describing connectivity between the vertices and/or geometry data describing the vertices in the 3D mesh model, wherein the order in which the vertices are decoded from the bitstream during connectivity or geometry data decoding defines the spiral-like scanning path.

Another approach to provide more efficient methods for encoding or decoding attribute values in 3D objects is defined in second embodiments.

The second embodiments of the invention provide a method of encoding, into a bitstream, a three-dimensional model made of a plurality of geometrical entities, such as vertices or points or faces or edges, the method comprising the following steps:

obtaining a scanning order of geometrical entities within the 3D model, mapping values of a given attribute taken by the geometrical entities respectively, to a 2D image, the attribute value of each geometrical entity being represented by a respective pixel in the 2D image, and encoding, using an image or video encoder, the mapped 2D image into a sub-bitstream, wherein the mapping maps the attribute values successively considered according to the obtained scanning order, to pixels of the 2D image using a raster scan order.

Correspondingly, the second embodiments of the invention also provide a method of decoding, from a bitstream, a three-dimensional model made of a plurality of geometrical entities, such as vertices or points or faces or edges, the method comprising the following steps:

obtaining a scanning order of geometrical entities within the 3D model, decoding, using an image or video decoder, a sub-bitstream into a 2D image, and mapping pixels forming the 2D image to values of a given attribute taken by the geometrical entities respectively, the attribute value of each geometrical entity being represented by a respective pixel in the 2D image, wherein the mapping maps the pixels of the 2D image successively considered according to a raster scan order, to attribute values of geometrical entities using the obtained scanning order.

The raster scan order scans an image line-by-line (or column-by-column), one line (column) at a time, always in the same direction (usually left to right for lines, and up to down for columns).

The raster scan order, either vertical (as shown below in FIG. 9) or horizontal, provides, on average, a more constant spatial distance in the scanning order referential, between two adjacent pixels in the 2D image, compared to conventional zigzag order. Correlations between adjacent pixels in the 2D image are thus more constant, resulting in better compression of the 2D image encoding the attribute values.

The encoding of the entire 3D model or object is thus improved.

The encoding method may also include the encoding, into a first sub-bitstream, of connectivity data and/or of geometry data describing the geometrical entities in the 3D model. From the decoding perspective, a first sub-bitstream is decoded into connectivity data and/or geometry data describing the geometrical entities in the 3D mesh model.

From a device point of view, the second embodiments provide a device for encoding, into a bitstream, a three-dimensional model made of a plurality of geometrical entities, such as vertices or points or faces or edges, the device comprising at least one microprocessor configured for carrying out the following steps:

obtaining a scanning order of geometrical entities within the 3D model, mapping values of a given attribute taken by the geometrical entities respectively, to a 2D image, the attribute value of each geometrical entity being represented by a respective pixel in the 2D image, and encoding, using an image or video encoder, the mapped 2D image into a sub-bitstream, wherein the mapping maps the attribute values successively considered according to the obtained scanning order, to pixels of the 2D image using a raster scan order.

Also, the second embodiments of the invention provide a device for decoding, from a bitstream, a three-dimensional model made of a plurality of geometrical entities, such as vertices or points or faces or edges, the device comprising at least one microprocessor configured for carrying out the following steps:

obtaining a scanning order of geometrical entities within the 3D model, decoding, using an image or video decoder, a sub-bitstream into a 2D image, and mapping pixels forming the 2D image to values of a given attribute taken by the geometrical entities respectively, the attribute value of each geometrical entity being represented by a respective pixel in the 2D image, wherein the mapping maps the pixels of the 2D image successively considered according to a raster scan order, to attribute values of geometrical entities using the obtained scanning order.

The devices have the same advantages as the methods defined above.

Optional features of the second embodiments of the invention are defined in the appended claims. Some of these features are explained here below with reference to a method, while they can be transposed into system features dedicated to any device according to the second embodiments of the invention.

In embodiments, the raster scan order is a vertical raster scan order. An improved coding efficiency can be obtained with some codecs, such as the JPEG codec. This is because such codecs code vertical frequencies earlier given the zigzag scan order used.

In variants, the raster scan order is a horizontal raster scan order. This may apply with other codecs that give priority to horizontal frequencies.

In embodiments, an orientation of the raster scan order is determined based on the encoding/decoding method used to encode/decode the 2D image.

In embodiments, the 2D image is split into image blocks, and the raster scan order is used for said mapping of attribute values to pixels within one or more image blocks of the 2D image. Preferably, such approach is performed within each of all image blocks.

This configuration based on a block structure splitting the image is particularly appropriate for block-based codecs. Of course, the same block size should be used to take advantage of the properties of the codec.

In that case, the spatial distance within each block is reduced; the correlations between pixels within each block are increased; thereby providing an improved coding efficiency.

In specific embodiments, the image blocks of the 2D image are successively considered for said mapping, using a raster scan order different from the raster scan order used to map attribute values to pixels within each image block. Preferably, the horizontal raster scan is used for successively considering the blocks and the vertical raster scan is used for the actual mapping within each block. Of course the reverse is possible.

This approach allows spatial redundancies between blocks, particularly between adjacent blocks, to be kept. Higher coding efficiency can thus be obtained.

In some embodiments, the raster scan order is used at image level to map attribute values to pixels, meaning that no image block is used when a raster scan ordered mapping is performed.

In other embodiments, the given attribute is a colour attribute defining the colours of the geometrical entities forming the 3D model.

In yet other embodiments, the raster scan order is selected from a vertical raster scan order and a horizontal raster scan order, based on an encoding method used by the image or video encoder to encode the mapped 2D image or on a decoding method used by the image or video decoder to decode the sub-stream. Thus the best raster scan order can be selected to obtain the best coding/decoding performance, depending on which encoder/decoder is used.

In yet other embodiments, the 3D model is a mesh model, and the geometrical entity scanning order includes a parsing order in which vertices composing the 3D mesh model are successively considered to encode or decode connectivity data describing connectivity between the vertices. According to a specific feature, the 3D mesh model is composed of triangles, and the method further comprises:

traversing successively each vertex constituting the 3D mesh model; and for each vertex successively traversed, encoding or decoding connectivity data describing connectivity between vertices in the 3D mesh model.

The proposed connectivity-based scanning order keeps high correlation between consecutive vertices (because they are neighbours within the 3D model). Thus, such scanning order provides good encoding performances.

That is why, in some embodiments, the scanning order of the geometrical entities within the 3D model is obtained using a neighbouring-based discovery procedure.

Another approach to provide more efficient methods for encoding or decoding attribute values in 3D objects is defined in third embodiments.

The third embodiments of the invention provide a method of encoding, into a bitstream, a three-dimensional model made of a plurality of geometrical entities, such as vertices or points or faces or edges, the method comprising the following steps:

obtaining a scanning order of geometrical entities within the 3D model, mapping values of a given attribute taken by the geometrical entities respectively, to a 2D image, the attribute value of each geometrical entity being represented by a respective pixel in the 2D image, and encoding, using an image or video encoder, the mapped 2D image into a sub-bitstream, wherein the encoding of the mapped 2D image into a sub-bitstream is performed using the Screen Content Coding Extension of an HEVC encoder, and/or the mapping of the attribute values to the 2D image depends on an encoding method used by the image or video encoder to encode the mapped 2D image.

The ISO/IEC 23008-2:2013 is a well-known standard referring to High Efficiency Video Coding (HEVC) dated April 2013.

The last version of HEVC Screen Content Coding (SCC) Extension is described in document JCTVC-W1005 dated 25 Jun. 2016.

Correspondingly, the third embodiments also provide a method of decoding, from a bitstream, a three-dimensional model made of a plurality of geometrical entities, such as vertices or points or faces or edges, the method comprising the following steps:

obtaining a scanning order of geometrical entities within the 3D model, decoding, using an image or video decoder, a sub-bitstream into a 2D image, and mapping pixels forming the 2D image to values of a given attribute taken by the geometrical entities respectively, the attribute value of each geometrical entity being represented by a respective pixel in the 2D image, wherein the decoding of the sub-stream into the 2D image is performed using the Screen Content Coding Extension of an HEVC decoder, and/or the mapping of the pixels forming the 2D image to attribute values depends on a decoding method used by the image or video decoder to decode the sub-stream.

The 2D image resulting from the mapping usually looks more like a natural content image than screen content image. However, surprisingly, the inventors have observed that screen content coding tools provide better coding performance.

Also, better coding performance are also achieved by adapting the mapping to characteristics of the encoding method. Indeed, for instance, the specificity of a block-based encoder should be used to provide a higher correlation between pixels within the blocks.

From a device point of view, the third embodiments provide a device for encoding, into a bitstream, a three-dimensional model made of a plurality of geometrical entities, such as vertices or points or faces or edges, the device comprising at least one microprocessor configured for carrying out the following steps:

obtaining a scanning order of geometrical entities within the 3D model, mapping values of a given attribute taken by the geometrical entities respectively, to a 2D image, the attribute value of each geometrical entity being represented by a respective pixel in the 2D image, and encoding, using an image or video encoder, the mapped 2D image into a sub-bitstream, wherein the encoding of the mapped 2D image into a sub-bitstream is performed using the Screen Content Coding Extension of an HEVC encoder, and/or the mapping of the attribute values to the 2D image depends on an encoding method used by the image or video encoder to encode the mapped 2D image.

Also, the third embodiments of the invention provide a device for decoding, from a bitstream, a three-dimensional model made of a plurality of geometrical entities, such as vertices or points or faces or edges, the device comprising at least one microprocessor configured for carrying out the following steps:

obtaining a scanning order of geometrical entities within the 3D model, decoding, using an image or video decoder, a sub-bitstream into a 2D image, and mapping pixels forming the 2D image to values of a given attribute taken by the geometrical entities respectively, the attribute value of each geometrical entity being represented by a respective pixel in the 2D image, wherein the decoding of the sub-stream into the 2D image is performed using the Screen Content Coding Extension of an HEVC decoder, and/or the mapping of the pixels forming the 2D image to attribute values depends on a decoding method used by the image or video decoder to decode the sub-stream.

The devices have the same advantages as the methods defined above.

Optional features of the third embodiments of the invention are defined in the appended claims. Some of these features are explained here below with reference to a method, while they can be transposed into system features dedicated to any device according to the third embodiments of the invention.

In embodiments, the Screen Content Coding Extension includes one or more of a palette coding mode, an Intro Block Copy coding mode, a transform skip coding mode, a residual colour transform coding mode, and a RDPCM coding mode. All these modes are defined in HEVC SCC.

In other embodiments, the encoding method is a block-based encoding method, and the mapping maps attribute values to blocks of pixels within the 2D image that have the same block size as the block size of the encoding method.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and devices.

Another aspect of the invention relates to a method, substantially as herein described with reference to, and as shown in, FIG. 10, or FIGS. 9 and 10, or FIG. 12, or FIGS. 12 and 13, or FIGS. 12, 13 and 17, or FIGS. 12, 13 and 18, or FIGS. 12, 13, 17 and 19, or FIGS. 12, 13, 18 and 19, or FIGS. 12 to 17 and 19, or FIGS. 12 to 16, 18 and 19 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 5a illustrates a TFAN decomposition of a 3D mesh;

DETAILED DESCRIPTION

The invention will now be described by means of specific non-limiting exemplary embodiments and by reference to the figures.

The present invention relates generally to the encoding of three-dimensional (3D) objects into a bitstream, usually 3D models made of a plurality of points, for instance a cloud of points or connected vertices forming polygons such as triangles. The invention particularly provides improvements to the coding of property data, which are additional to geometry data and possible connectivity data used to respectively describe the locations or positions of the vertices within the space and the connectivity between the vertices in case of a 3D mesh model.

Figure 1:
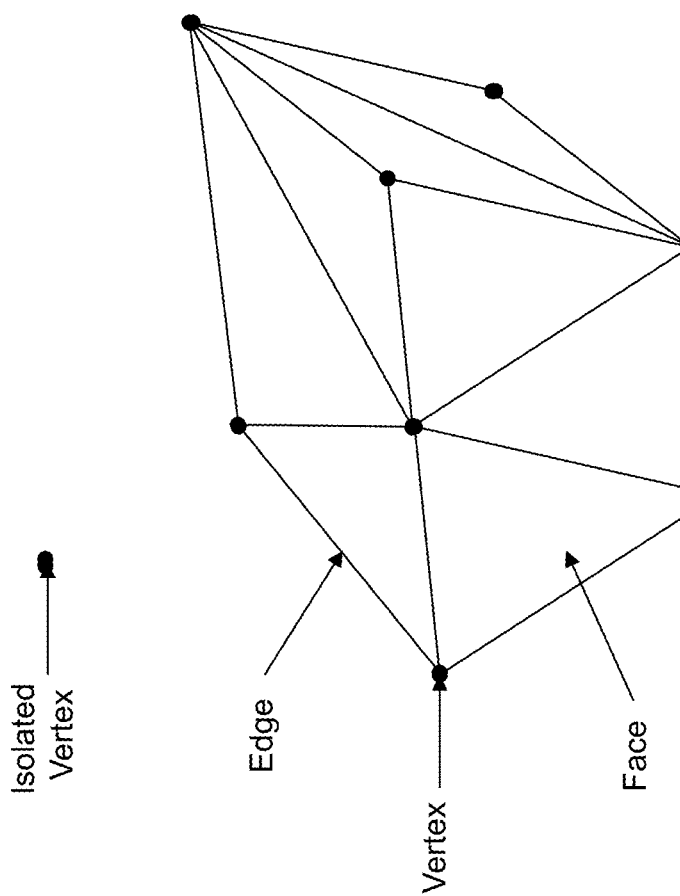
FIG. 1 illustrates a 3D mesh model is a representation of a tri-dimensional object or scene.

A 3D mesh model is a representation of a tri-dimensional object or scene. As shown in FIG. 1, it comprises vertices, edges connecting vertices and faces defined by edges. Isolated vertices, one of which is shown in the Figure, does not belong to any edge or face. Two isolated vertices may be connected one to the other without belonging to a face.

Although various face geometries can be used, for instance polygons such as quadrilaterals, a substantial part of the 3D mesh models is based on triangle-shaped faces.

The relationship between the various vertices as represented by the faces or edges is called connectivity, while the positions of the vertices form what is called geometry. Connectivity data and geometry data are the main data to describe a 3D mesh model, and may be supplemented with other property data (e.g. a normal per vertex or per face, a colour per vertex and/or per face, a texture per face, etc.).

Point clouds differ from 3D mesh models in that the vertices (or points) are not connected one with the other. To make it short, each point is isolated. Thus, no connectivity data is generated and coded, compared to 3D mesh models.

The vertices, points, faces and edges, if any, form what is called "geometrical entities" of the 3D model, in the meaning they contribute to the 3D definition of the model within space.

Most 3D compression algorithms compress connectivity data and geometry data separately. The coding order of geometry data is determined by the underlying connectivity coding. The order in which the vertices are successively considered or "traversed" to code the connectivity data and the geometry data is referred to below as a scanning or parsing order.

3D mesh property data are usually compressed by a method similar to geometry compression.

Figure 2:
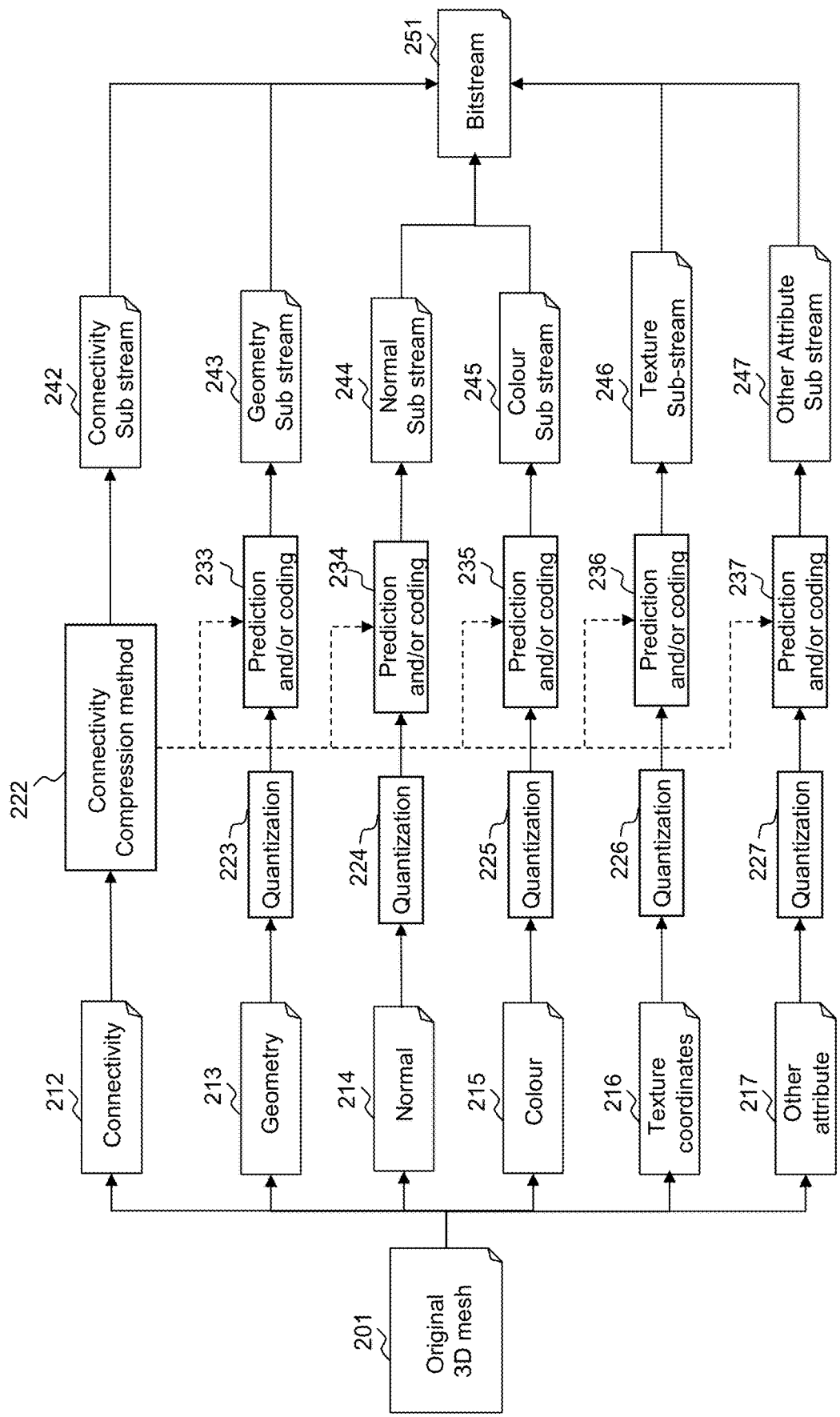
FIG. 2 illustrates general steps of a 3D mesh encoding process, in particular in the context of Scalable Complexity 3D Mesh Compression (SC3DMC)

FIG. 2 illustrates general steps of a 3D mesh encoding process, in particular in the context of Scalable Complexity 3D Mesh Compression (SC3DMC).

Connectivity data, geometry data and property data are coded separately. Each of them 212 to 217 is extracted from the original 3D mesh model 201.

These data, except the connectivity data, can be quantized 223 to 227. The quantization is based on the number of bits needed to represent the data. The quantized geometry and property data are predicted and/or encoded directly with respective entropy encoders, which may be arithmetic encoders 233 to 237.

Also the encoder compresses, i.e. encodes, the connectivity data at block 222. This is usually based on a well-known triangle-based fan (TFAN) approach. However, alternative approaches also exist.

The current standard offers a plurality of coding methods and prediction methods for the quantized geometry and property data. A widely-used method is the so-called "connectivity-based geometry prediction", which provides efficient prediction. The main idea of this method is to use the connectivity between vertices (i.e. the connectivity data) to generate a geometry predictor. One known method of the connectivity-based geometry prediction is the parallelogram predictor described for instance in publication "*Triangle mesh compression*" (Touma C. and Gotsman C., Proceedings of the 1998 Graphics Interface Conference, p. 26-34, 1998).

The use of the connectivity between the vertices to encode the geometry and/or property data is shown in the Figure by the hash arrow. While the Figure shows a hash arrow from block 222 (i.e. from connectivity data being encoded), the hash arrow may directly come from the connectivity data 212.

Next to the encoding, all the obtained sub-streams 242 to 247 (each representing one of the connectivity/geometry/property data) are combined together to form the output bitstream 251, for instance through a mere concatenation of sub-streams.

Figure 3:
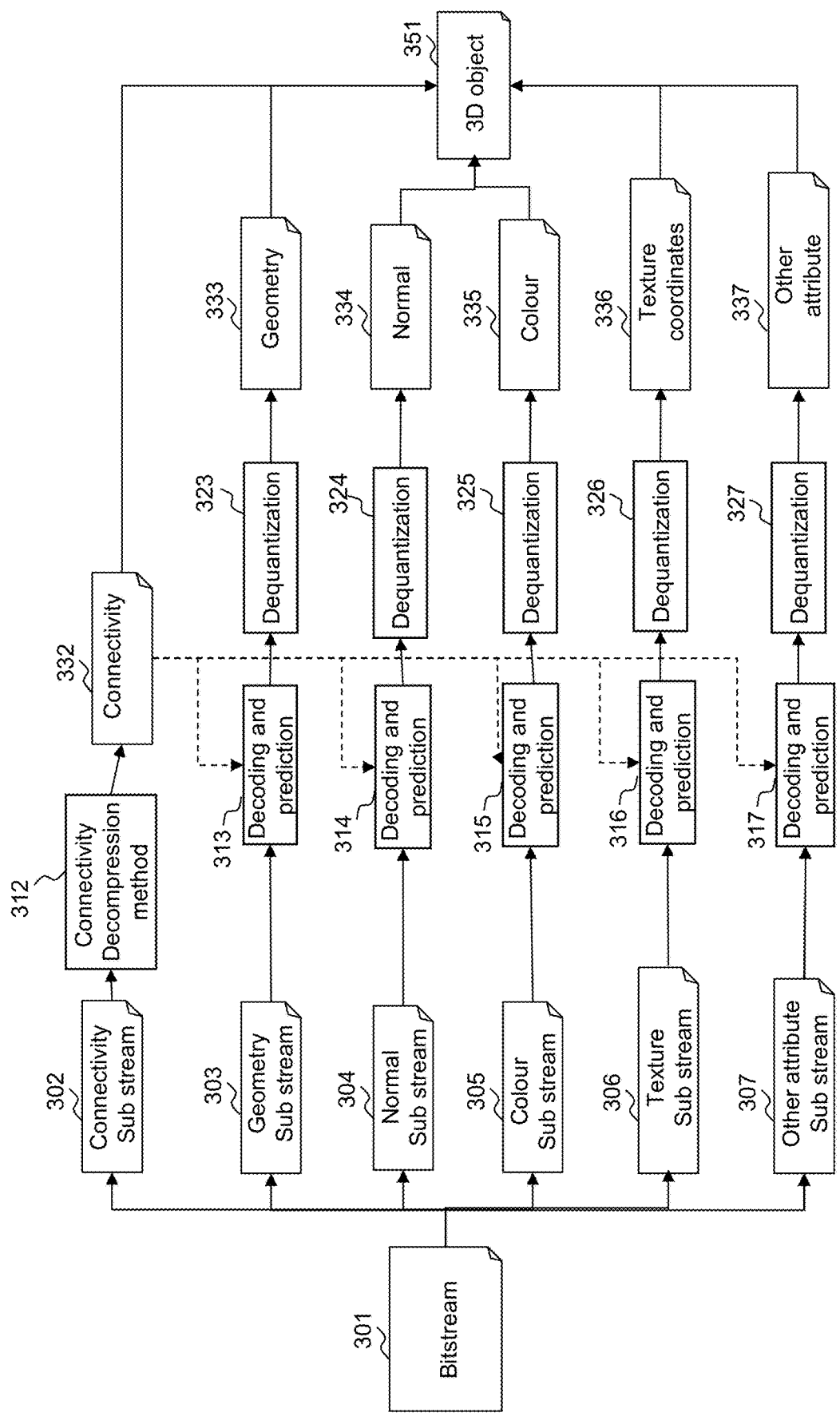
FIG. 3 illustrates general steps of the corresponding bitstream decoding process, into a 3D mesh model, in the context of SC3DMC.

FIG. 3 illustrates general steps of the corresponding bitstream decoding process, into a 3D mesh model, in the context of SC3DMC. The Figure is self-explicit since it produces the inverse process as the one of FIG. 2.

For instance, the bitstream 301 is extracted and split into subparts 302 to 307 corresponding to each coded data from the connectivity, geometry and property data. Each of them is entropy decoded and decompressed or inverse predicted (blocks 312 to 317). As mentioned for the encoding process, the prediction can be based on the decoded connectivity data 332.

Next, the decoded geometry and property data are dequantized at blocks 323 to 327 and inserted in the 3D object file 351 together with the connectivity data 332.

Obtained 3D object file 351 is the same as original 3D mesh model 201 except for the losses due to the quantization/dequantization processes.

The present invention focuses on the encoding and/or decoding of the property data, including one or more attributes 214-217/304-307.

The description below mainly focuses on the encoding/decoding of the colour attribute for ease of explanation. As all the attributes are expressed as numeral values, the explanation provided below with reference to the colour attribute can be directly applied to any of the other attributes.

Several possibilities exist to represent an attribute in 3D models, in particular the colour attribute.

First, a colour value can be set at vertex/point level, meaning that the 3D object contains an RGB or the like colour value(s) for each vertex or point.

In a variant, a colour value can be set per each face when the 3D model is a mesh model. It means that for each face, the 3D object contains its related RGB colour value(s).

In another variant, a colour value can be set for each edge of a face (e.g. a triangle).

Still for ease of explanation, the description below focuses on the encoding/decoding of colour-per-vertex attribute. Adaptation to colour-per-face and colour-per-edge attribute directly derives from this description, providing faces or edges are respectively successively considered, instead of considering successive vertices or points.

The compression of property data is important because they form a substantive portion of encoded data in the bitstream. Thus property data compression improvement is sought.

A more detailed presentation of the conventional approach for these encoding/decoding is given below.

The basic information of the property data, such as the colour-per-vertex attribute values, in a raw file is one or more attribute values per each geometrical entities. For instance, it is an RGB or the like colour value for each related vertex or point.

As mentioned above, the first step for the compression or encoding of the colour-per-vertex data 215 is a quantization step 225. This step quantizes all RGB colour component values.

This step is necessary because, in the input files or in the memory of computers, the colour component values are often represented by three IEEE 32-bit floating-point numbers. However, the 32-bit precision provided by such a representation is not required in most of the applications.

Quantization can thus significantly reduce the amount of property data (in terms of bits) to encode, without limited quality losses (usually not perceptible by a human being).

Conventional scalar quantization consists in transforming the floating-point number positions into positive integer colour component values.

In SC3DMC, the quantization of colour-per-vertex component values is based on the range of each component (R, G, B) as described in the following pseudo code:

for i={R, G, B}

$$C'[i]=(C[i]-\text{Min}[i])*(1<<n Q\text{Bits}-1)/(\text{Max}[i]-\text{Min}[i])+0.5f$$

where $C[i]$ the original component 'i' of the vertex colour C, $C'[i]$ is the quantized component 'i', and $\text{Min}[i]$ and $\text{Max}[i]$ are respectively the minimum and the maximum values of all $C[i]$ (i.e. define the range of values for colour component 'i'). Operator X<<Y means a left shift of the number X by the number of digit Y in base 2. It corresponds to Y integer divisions by 2 (i.e. division by $2^Y$).

This quantization means that the value range $\text{Max}[i]$-$\text{Min}[i]$ for each colour component is represented according to a certain number of bits given by the quantization parameter nQBits. But with this quantization, the colour components of a vertex do not have the same precision given the different value ranges for the colour components within the mesh or point cloud.

Moreover, when the correct number of bits per colour component is used (8 bits in most applications), the above conversion increases the range of a colour component which is not correctly exploited by a classical image or video codec.

To overcome this limitation, proposed implementations rely on a different quantization formula for colour component, for instance as the one given by the following formula:

for i={R, G, B}

$$C'[i]=(C[i]-\text{Min}[i])*(1<<nQ\text{Bits}-1)+0.5f$$

Furthermore, both quantization formulae above include the minimum value $\text{Min}[i]$ for each colour component. While this inclusion may be of interest for conventional predictions, it may however cause some issues when the image or video codec uses a YUV conversion or coding.

Thus, additional proposed implementations dedicated to an image or video codec using a YUV conversion rely on the following quantization formula:

for i={R, G, B}

$$C'[i]=C[i]*(1<<nQ\text{Bits}-1)+0.5f$$

When applying this quantification formula, the same bit depth is preferably used for the colour components as the bit depth used in the codec.

Next to the quantization, the attribute value of the vertex, in particular the colour component triplet, is encoded.

The SC3DMC standard defines six encoding methods, the majority of which is based on prediction.

A first approach, named "No Prediction", encodes each colour component without prediction.

A second approach, named "Differential" uses delta prediction according to which the colour attribute triplet of the current vertex is predicted by the colour attribute triplet of the immediately previous (last encoded) vertex. The immediately previous vertex is defined by the scanning order in which the vertices are successively considered.

The delta (or prediction error), also known as residue, representing the colour difference is then encoded.

A third approach, named "Circular Differential", supplements the Differential method by modifying the predicted value if it exceeds a maximum size.

A fourth approach, named "Adaptive", is the adaptive prediction method of the SC3DMC standard. In this approach, each colour triplet of the current vertex is predicted by one from among the seven last encoded colour triplets or is not predicted. The index of the best prediction, in terms of coding cost, from among these eight possible predictions is transmitted.

A fifth approach, named "XOR", encodes the colour components as the result of an XOR operation between the colour attribute triplet of the current vertex and the colour attribute triplet of the immediately previous (last encoded) vertex.

A sixth approach, known as "Fast Parallelogram", is the above-mentioned conventional connectivity-based parallelogram prediction, which uses the connectivity between vertices (connectivity data 212) to define predictors from connected vertices.

The Fast parallelogram prediction is a very efficient method for geometry prediction.

Besides valence-driven connectivity encoding, "*Triangle mesh compression*" (Touma C. and Gotsman C., Proceedings of the 1998 Graphics Interface Conference, p. 26-34, 1998) introduced parallelogram prediction.

Figure 4:
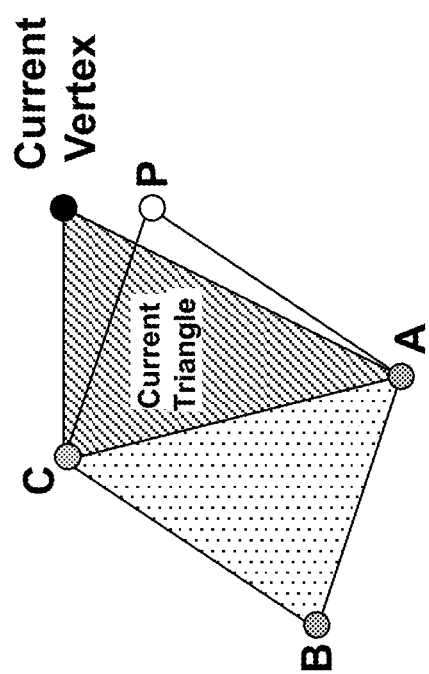
FIG. 4 illustrates parallelogram predictor according to the prior art.

In the case of FIG. 4, a predictor is searched for the next vertex connected to vertices A and C (i.e. forming a triangle with them). A piece of knowledge is triangle ABC.

The parallelogram-based prediction introduces a new vertex P as shown in FIG. 4 to form a triangle from the edge AC, such that the ABCP form a parallelogram. Vertex P is thus used as a predictor for the geometry data of the current vertex to encode.

The parallelogram-based prediction is also applied to encode the property data. For instance, the colour triplet of the current vertex is predicted by the colour triplets of vertices ABC as follows; C+A-B.

Whatever the prediction method used, if the prediction is accurate, the prediction error (residue) is small, so it can later be efficiently entropy coded.

Experimentally, the Circular Differential method seems to be the best prediction method to encode colour-per-vertex attributes.

For these available prediction methods, the last encoded (or immediately previous) vertex or vertices are considered. The order in which the vertices are successively considered, (i.e. the scanning order) should thus be known. Usually it is obtained when determining the connectivity data from the 3D mesh model.

The basic information to determine the connectivity data is a list of triangles in a raw file.

These connectivity data are obtained through the well-known triangle-based fan (TFAN) approach as now described with reference to FIGS. 5 to 6. Other techniques exist for point clouds.

Given a vertex order to traverse all the vertices of original 3D mesh model 201 (e.g. according to a vertex order, e.g. a spiral order), the TFAN approach traverses successively each vertex constituting the 3D mesh model; and for each vertex successively traversed, performs a triangle-based fan (T-FAN) analysis centred on the traversed vertex (i.e. one vertex of the triangles considered in the fan is the traversed vertex) to discover any new triangle not yet discovered when traversing the previous vertices, and determines (TFAN) connectivity data between vertices based on the newly discovered triangle or triangles.

Figure 5:
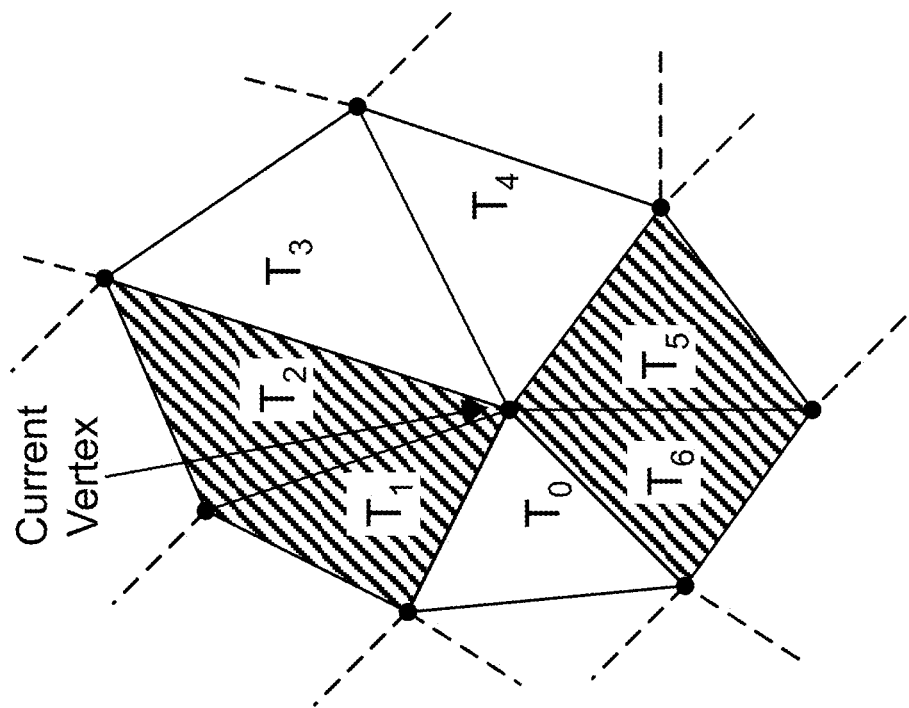
FIG. 5 illustrates two situations of triangle-based fan (TFAN) analysis.
Figure 5:
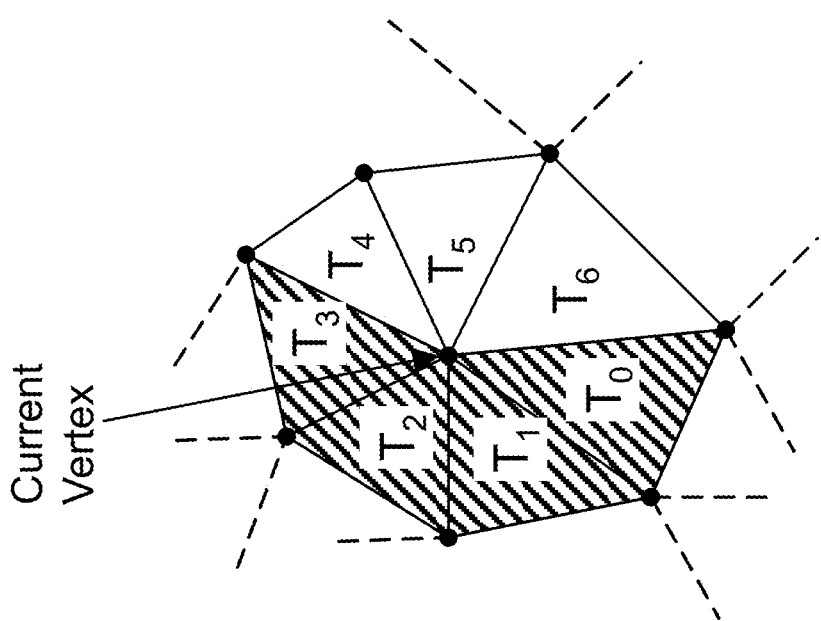

FIG. 5 illustrates two situations that may be encountered when traversing a current vertex, used to explain the TFAN approach. The two examples show portions of the 3D mesh when traversing the vertex identified as "current vertex" (in the centre of each portion).

The core principle of TFAN approach is to signal the connectivity of the current vertex by fans or fan portions of non-already discovered (or signalled) triangles. A fan portion is made of a contiguous series of newly discovered triangle or triangles, and comprises one or more triangles. A triangle is said to be discovered when it is identified when traversing a current vertex. It means that this triangle has been encoded in the bitstream when the processing of the current vertex ends. The triangle is said to be already discovered if it has been identified when traversing a previous vertex.

In the two examples of FIG. 5, the hatched triangles have been discovered and thus encoded when TFAN analysing previously-traversed vertices. The empty triangles are newly discovered triangles when TFAN analysing the current vertex; i.e. they are not yet encoded in the bitstream.

In the left-side example of the Figure, triangles $T_0$, $T_1$, $T_2$ and $T_3$ are already-discovered (encoded) triangles, while triangles $T_4$, $T_5$ and $T_6$ are newly-discovered triangles (not yet encoded). This example thus shows a single new triangle-based fan portion made of successive triangles $T_4$, $T_5$ and $T_6$.

Similarly, in the right-side example of the Figure, triangles $T_1$, $T_2$, $T_5$ and $T_6$ are already-discovered (encoded) triangles, while triangles $T_0$, $T_3$ and $T_4$ are newly-discovered triangles (not yet encoded). This example thus shows two new triangle-based fan portions, respectively made of triangles $T_0$ and made of successive triangles $T_3$ and $T_4$.

FIG. 5a illustrates a triangle-based fan decomposition of a mesh quite simple.

When traversing a first considered vertex $V_1$, a first fan containing triangles $T_0$, $T_1$, $T_2$, $T_3$, $T_4$, $T_5$ and $T_6$ is identified and then encoded as described below. The TFAN analysis thus discovers the vertices in the following scanning order: $V_2$, $V_3$, $V_4$, $V_5$, $V_6$, $V_7$, $V_8$.

When traversing the next vertex $V_2$ according to the scanning order, a second fan portion containing triangles $T_7$, $T_8$, $T_9$ and $T_{10}$ is identified and then encoded. The scanning path thus continues with $V_9$, $V_{10}$, $V_{11}$.

When traversing the next vertex $V_3$ according to the scanning path, a third fan portion containing triangles $T_{11}$ and $T_{12}$ is identified and then encoded. The scanning path thus continues with $V_{12}$.

And so on with the next discovered vertices.

From discovered vertex to discovered vertex, the TFAN analysis builds a scanning path that looks like a spiral: $V_1$, $V_2$, $V_3$, $V_4$, $V_5$, . . . , $V_{23}$, $V_{24}$, $V_{25}$ in the example of FIG. 5a (shown by a thick solid line).

Figure 6:
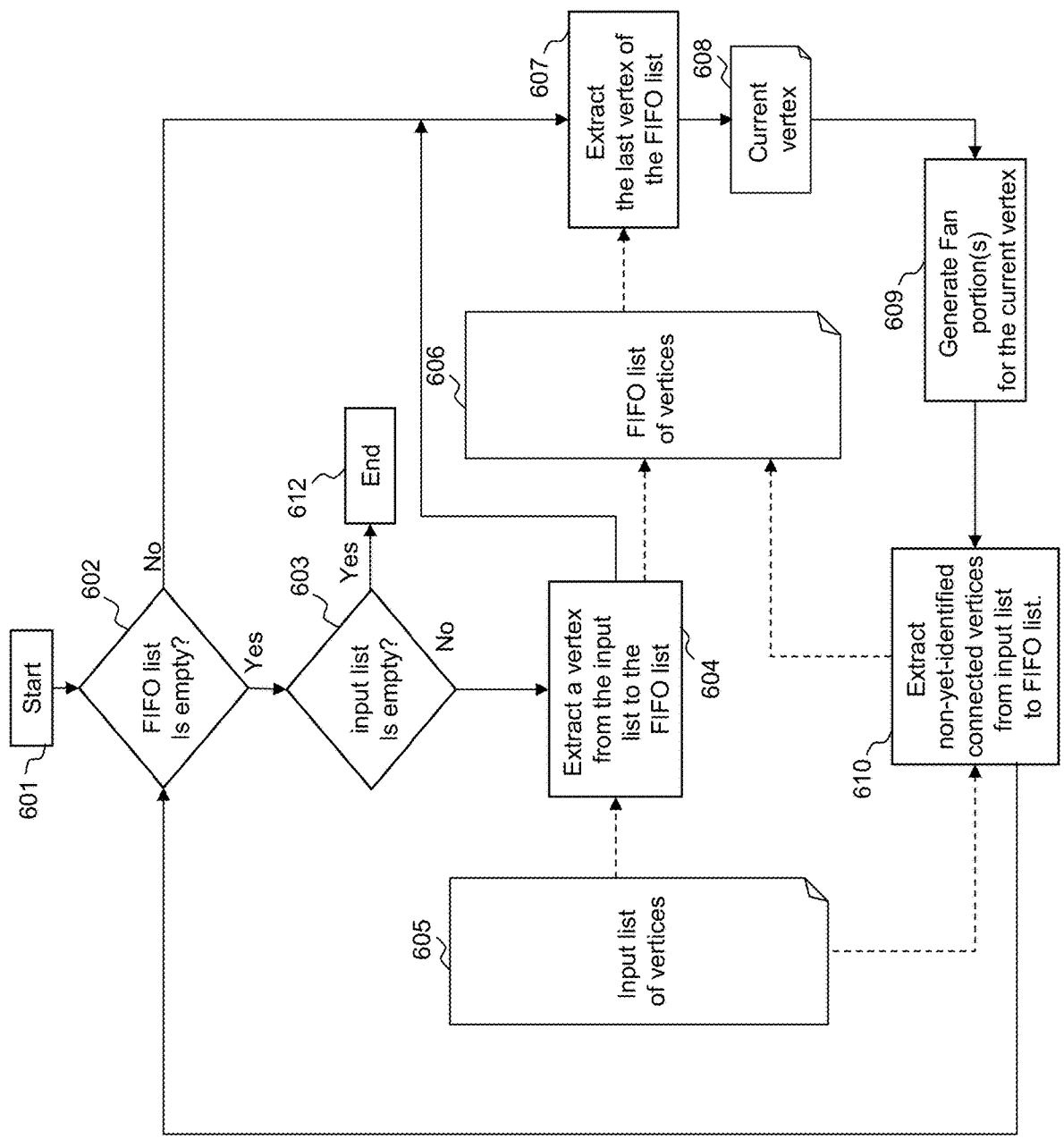
FIG. 6 illustrates general steps for generating mesh connectivity data of a 3D mesh.

FIG. 6 illustrates general steps for generating mesh connectivity data to encode them, and to obtain a spiral-like scanning path of vertices forming triangles within the 3D model. At the beginning, all the vertices of original 3D mesh model 201 (or point cloud) as read in the raw data are marked as non-identified (or non-visited), which may be made by inserting them into an input list of vertices 605.

The algorithm also uses a FIFO (First-In First-Out) queue structure 606 which is used to contain a list of the vertices identified when traversing previous vertices, but not already encoded (i.e. not already traversed. Indeed, the result of the processing when traversing a vertex is its encoding).

At the beginning 601 of the process, the FIFO queue structure 606 is empty (test 602) while the input list is not empty (test 603). A first vertex from the input list of vertices 605 is thus extracted from the input list (shown by the dash arrow from 605) and inserted into the FIFO list 606 (shown by the dash arrow to 606) at step 604. When the input list becomes empty at test 603, the process ends at step 612.

The first inserted vertex is the last vertex of the FIFO queue structure and is thus traversed at step 607, i.e. it becomes the current vertex 608 to generate corresponding connectivity data. To do so, it is extracted from FIFO 606 (as shown by the dash arrow from 606).

A TFAN analysis is thus conducted at step 609 during which one or more fan portions are generated, for instance as shown in FIG. 5. Each fan portion contains a series of contiguous non-encoded triangles connected to the current vertex.

The connected vertices which have not yet been identified when the previous vertices have been traversed (i.e. the connected vertices still in the input list 605) are extracted from the input list 405 (shown by the dash arrow from 605) at step 610 and inserted into the FIFO queue structure 606 (shown by the dash arrow to 606).

The order in which the vertices are successively inserted in the FIFO queue structure 606 is the scanning order mentioned above. Due to the properties of the TFAN analysis, this scanning order of vertices substantially defines a spiral-like scanning path of the vertices in the 3D mesh model.

At this stage the current vertex is considered as encoded and will never be referenced again during the process. Indeed, it is no longer in the input list 605 and in the FIFO queue structure 606.

Next to step 610, a next vertex must be selected to be traversed. This is step 607.

However, it is first determined whether the FIFO queue structure 606 is empty or not at step 602, so that the last vertex in the FIFO queue structure 606 is selected as the new current vertex 608 in case the FIFO is not empty. Otherwise, the FIFO is feed through step 604 described above before selecting the last vertex of the FIFO at step 607 as being the new current vertex 608. Step 609 can thus be performed again on the new current vertex.

By looping back to step 602 and then to step 607, all the vertices of the 3D mesh model are successively considered for a TFAN analysis, until the input list 605 becomes empty, in which case the process ends (step 612).

Connectivity data describing the fan portions discovered at steps 609 are transmitted in the bitstream to the decoder, for the latter to be able to reconstruct the connectivity between the vertices of the 3D mesh, as well as the spiral-like scanning path.

To do so, the connectivity data at a vertex currently traversed are encoded. Four main connectivity variables forming the connectivity data are usually handled.

A first connectivity variable is the number, also known as "Nfans", of triangle-based fan portions or any parameter representing such number, newly identified when processing the current vertex. For instance, in the left-side example of FIG. 5, Nfans=1 (fan portion [$T_4$, $T_5$, $T_6$]), while in the right-side example of FIG. 5, Nfans=2 (fan portions [$T_0$] and [$T_3$, $T_4$]).

The variable Nfans is transmitted once for each vertex successively traversed.

If Nfans equals 0, it means that all triangles connected to the current vertex have already been discovered and thus encoded in the connectivity data relating to previous vertices traversed, or that the current vertex is an isolated vertex. In that case, no more connectivity data is transmitted for the current vertex.

Otherwise, the other connectivity variables are provided for each of the identified triangle-based fan portions. These variables describe each fan portion.

A second connectivity variable, also known as "degree of fan", is based on the number (or any parameter representing such a number) of vertices additional to the vertex currently traversed that form the triangle-based fan portion, i.e. that form each of the triangles forming the fan portion. It may be computed from the number of triangles composing the fan portion considered. Usually, it is this number of triangles plus one when the fan portion is opened, and it is this number only when the fan portion is closed (i.e. it is a whole fan).

It means the degree of fan is 4 for the left-side example of FIG. 5, and is 2 and 3 for respectively the two fan portions of the right-side example of FIG. 5.

Third and fourth connectivity variables are used as identification data to identify a series of vertices forming the triangle-based fan portion.

The third connectivity variable is made of a bitmap, also known as "OPS",

The fourth connectivity variable is a list of one or more vertex indices that is associated with the bitmap. The vertex identifiers are usually indexes taken from one or more list of vertices as explained below.

In use, each bit of the bitmap indicates whether a corresponding vertex in the identified series has yet been identified when traversing the previous vertices, or not. The associated list of vertex indices identifies the vertices forming the fan portion that have already been identified when traversing the previous vertices.

Once the scanning path is known, the geometry data and property data are encoded one vertex after the other.

Figure 7:
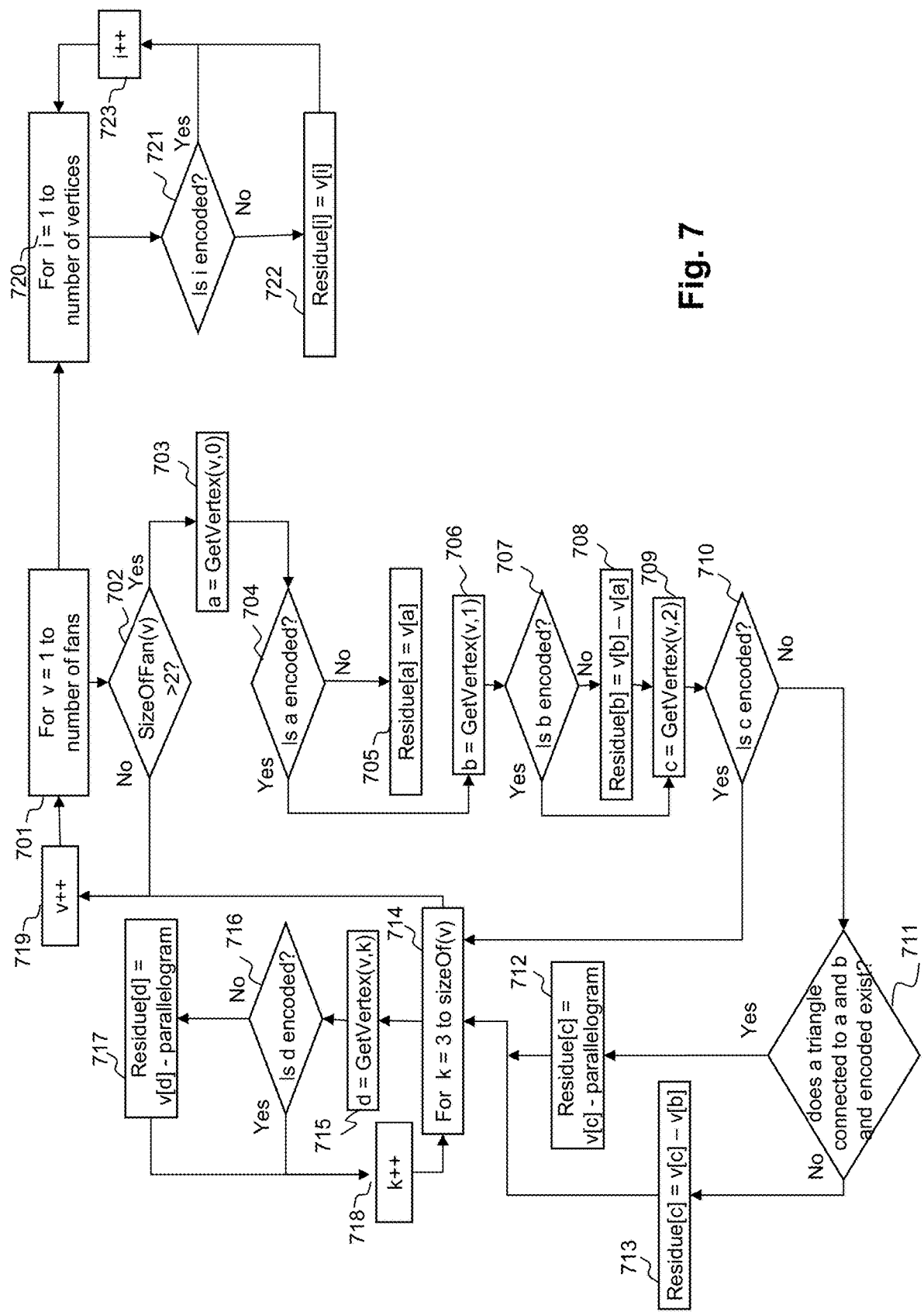
FIG. 7 illustrates general steps of the encoding of geometry or property data in the context of connectivity-based prediction of the SC3DMC software.

FIG. 7 illustrates general steps of the encoding of geometry data in the context of connectivity based geometry prediction of the SC3DMC software. This algorithm may thus be implemented in step 233 after the connectivity data have been encoded (222).

The same algorithm may be used for encoding the colour per vertex attribute value.

The encoding of the geometry data includes a first part (steps 701-719) to encode the geometry data or any property data of the vertices forming each fan portion as discovered during the TFAN analysis, and a second part (steps 720-723) to encode the geometry/property data of isolated vertices in the mesh.

A first loop (701) goes through each fan portion. If the size (in number of vertices) of the current fan portion is strictly superior to 2 (test 702), vertex 'a' is set equal to the first vertex of this fan portion according to an encoding order. This is step 703. Otherwise the current fan portion is made of one or two isolated vertices. This is because a fan portion contains at least one vertex or at least one triangle (the size in number of vertices cannot be equal to 2 by definition of a triangular mesh). Isolated vertices are encoded in the second part from step 720.

If the first vertex 'a' of the current fan portion has not yet been encoded (test 704), its geometry (i.e. position) or its considered property (e.g. colour) is not predicted, meaning that the geometry or attribute value to encode, namely the residual below, for this vertex is set equal to the current position value or current attribute value of this vertex (for each position component X, Y and Z or each colour component). This is step 705. Note that the first vertex of a fan portion is usually already coded if it is not the very first fan portion of a 3D object.

Next (if 'a' is already encoded or next to step 705), vertex 'b' is set equal to the second vertex of the current fan portion at step 706. Again, if the second vertex 'b' of the current fan portion has not yet been encoded (test 707), its geometry (i.e. position) or its considered property (e.g. colour) is predicted by the corresponding value of the previous vertex, namely by 'a'. It means that the residual for this second vertex is set equal to its position value minus the position value of the first vertex 'a' (for the geometry data) or set equal to its attribute value minus the attribute value of the first vertex 'a' (for an attribute value such as the colour). This is step 708.

Next (if 'b' is already encoded or next to step 708), vertex 'c' is set equal to the third vertex of the current fan portion at step 709.

Note that the vertices 'a', 'b' and 'c' form the first triangle of the current fan portion.

If 'c' has already been encoded, the process goes to step 714 to encode each other vertex of the current fan portion.

Otherwise, if there is a triangle already encoded which contains the vertices 'a' and 'b' (test 711; the other vertex is noted 'z'), this triangle is used to generate a parallelogram predictor to predict third vertex c: the residual for this third vertex 'c' is set equal to its position value minus the position value of the parallelogram predictor (for the geometry data). For any attribute value, the attribute parallelogram predictor may be defined by B+A−Z, where A, B, Z are the corresponding attribute values of respectively vertices a, b and z: the residual for third vertex 'c' is thus set equal to its attribute value minus the attribute value B+A−Z. This is step 712.

If no such triangle exists, third vertex 'c' is predicted by second vertex 'b' at step 713: the residual for this third vertex 'c' is set equal to its position/attribute value minus the position/attribute value of the second vertex 'b'.

Next to steps 712 and 713, all other vertices of the current fan portion are successively considered through steps 714, 715 and the loop from 718.

If the vertex has not already been encoded (test 716), it is predicted by a parallelogram predictor at step 717 (in the same way as described above).

Once all the vertices of the current fan portion have been processed, the next fan portion is considered at step 719.

Once all the fan portions have been analysed, the algorithm goes through all vertices of the 3D encoded object (step 720) in order to encode the isolated vertices.

This is done by checking whether the vertex currently considered is already encoded (test 721), in which case the next vertex is considered.

Otherwise, the position/attribute residual for the vertex currently considered (and thus isolated vertex) is set to the position/attribute value of this current vertex. It means that the isolated vertices are not predicted.

Although not represented in the Figures, the corresponding decoding process is straightforward from the encoding process. It consists in changing the word encoded by decoded in FIG. 7 and in adding the predictor to the residue retrieved from the bitstream, instead of subtracting the predictor from the vertex position/attribute value. For instance, when the encoder performs the following operation "Residual[c]=c−parallelogram", the decoder correspondingly performs an inverse operation "c=Residual[c]+parallelogram".

Note that the prediction is made for the three position components (X, Y, Z) at the same time for the geometry data; for the three colour components (R, G, B—or the like) at the same time for the colour attribute data.

Other techniques have been developed for point clouds, since no connectivity data exist.

For instance, one method is proposed in above-mentioned publication "*Design, Implementation and Evaluation of a Point Cloud Codec for Tele-Immersive Video*".

In this disclosed technique, the coordinates of the points are first coded in an octree structure, thereby obtaining a scanning path of points within the 3D model.

The values of the colour attribute taken by the scanned points are then mapped to a 2D image, the attribute value of each scanned point being represented by a pixel in the 2D image.

Figure 8:
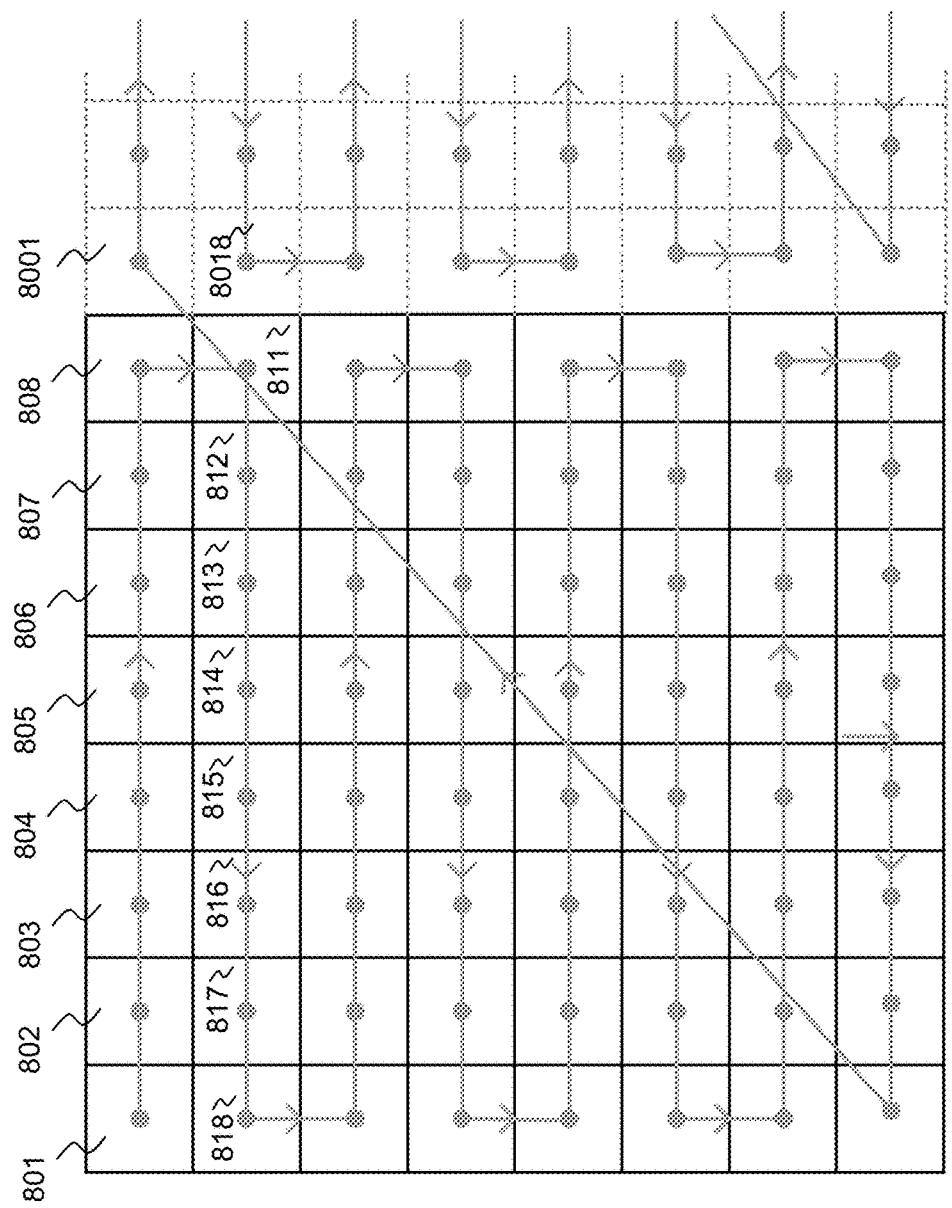
FIG. 8 illustrates a zigzag scan order used in known techniques to map attribute values of a 3D model to a pixel block of a 2D image.

In details, the colour values are mapped to 8×8 blocks in the 2D image based on the depth first octree traversal. The colour values successively considered according to the scanning order are mapped to pixels of the blocks using a "zigzag pattern" as depicted in FIG. 8. The mapping process receives a 1D list of colours, corresponding to the traversal of the octree, and then maps the 1D list to a 2D image.

The resulting mapped 2D image is then encoded using a legacy JPEG codec.

The improved coding efficiency would allegedly result from the fact that in the depth first traversal subsequent pixels are often co-located.

The coding efficiency of this mapping-based attribute encoding is not satisfactory.

Improved methods for encoding or decoding attribute values in 3D objects are thus searched.

Embodiments are proposed that provide more efficient encoding or decoding of attribute values, in particular an improved compression of the 2D image. This is achieved by providing a more efficient mapping to the 2D image, in order to take advantage of correlation between pixels or vertices or points. The embodiments proposed below can be combined or used alone.

In first proposed embodiments, 3D spatial correlation between the vertices or points in the 3D model is taken into account in order to obtain a mapped 2D image of attribute values that can be encoded with a higher compression ratio.

These first embodiments take advantage of a scanning path that looks like a spiral to construct the mapped 2D image. Such a spiral-like scanning path may be discovered using a neighbouring-based discovery procedure, for instance using a triangle-based fan (T-FAN) analysis for 3D mesh models made of triangles. A spiral-like scanning path may also be built from a point cloud.

The inventors have advantageously noticed that each turn in the spiral-like scanning path is made of vertices/points that are substantially adjacent vertices/points of the next/previous turn in the same spiral-like path. High correlation between successive turns in the spiral-like path is thus found, that allow improved 2D image compression when each turn (and more generally an integer number of turns) is mapped to a respective line or column of the 2D image.

These first embodiments are described below with reference to FIGS. 12 to 20.

Second embodiments of the present invention improve the spatial correlation within the mapped 2D image of attribute values, thereby improving their compression. In particular, it takes advantage of the redundancies between the attribute values along the scanning path (1D list).

The inventors have identified two improvement axes: first by limiting high frequencies within the mapped 2D image, then by matching some features of conventional image codecs.

This is mainly achieved by using a raster scan order, instead of the zigzag scan order of FIG. 8.

The second embodiments are described below with reference to FIGS. 9 to 11.

Third embodiments are also proposed that surprisingly use particular coding tools. In particular, the inventors have surprisingly observed that screen content coding tools, in particular from HEVC standards, provide improved coding performance, despite the fact the mapped 2D image looks like natural content image.

Turning now back to the second embodiments briefly introduced above, geometrical entities are considered that can be vertices or points or faces or edges.

During the encoding, a scanning order of the geometrical entities within the 3D model is first obtained. It is an order in which the geometrical entities, let say vertices r points in the description below, are successively considered. A mapping of attribute values, let consider a colour attribute below, taken by the geometrical entities respectively to a 2D image is thus made. During the mapping, the attribute value of each geometrical entity being represented by a respective pixel in the 2D image. The mapping maps the attribute values successively considered according to the obtained scanning order, to pixels of the 2D image using a raster scan order. The resulting mapped 2D image is then encoded into a sub-bitstream.

During the decoding, the mapping maps the pixels of the 2D image successively considered according to a raster scan order, to attribute values of geometrical entities using the obtained scanning order.

Figure 9:
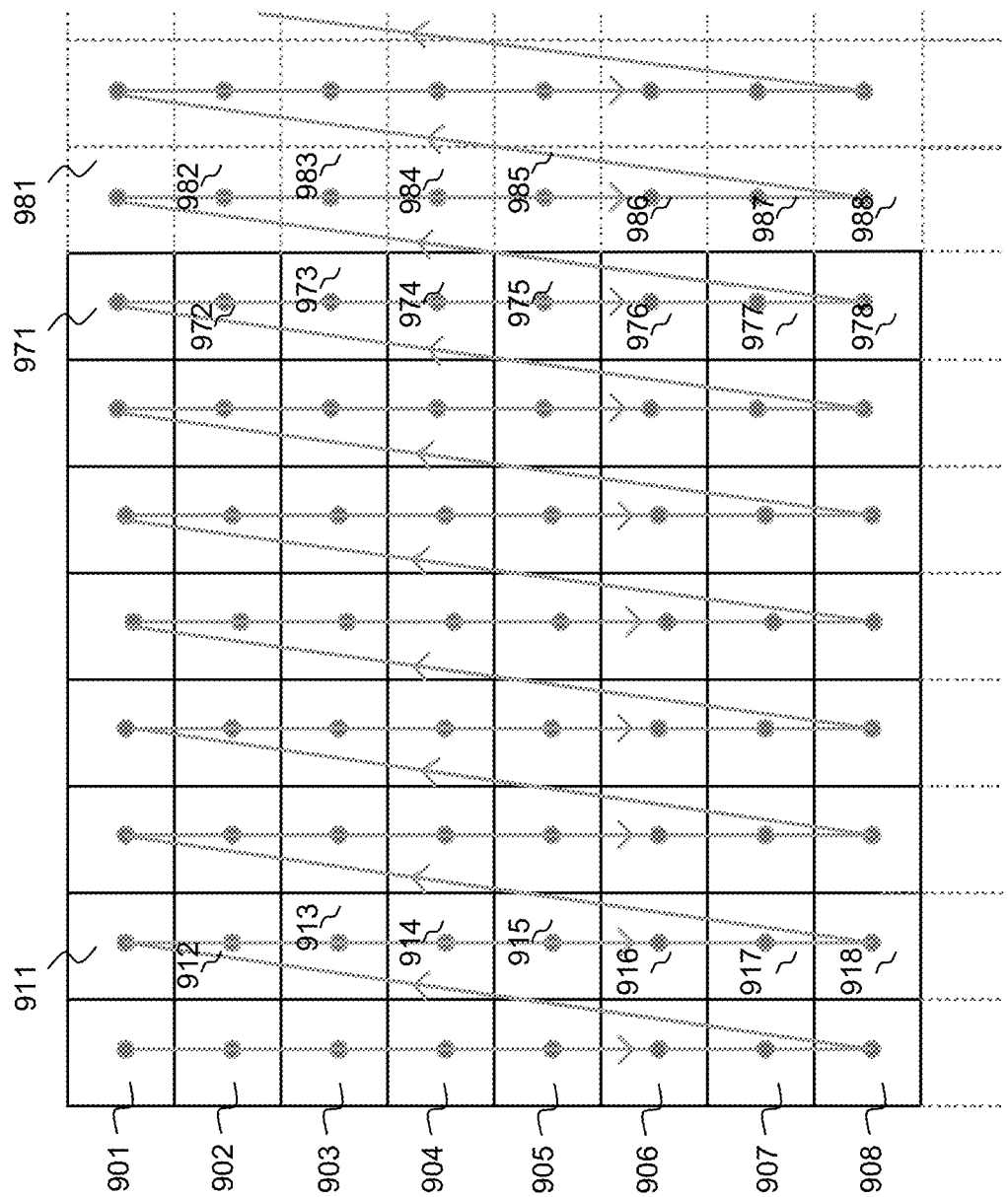
FIG. 9 illustrates a vertical raster scan order used to map attribute values of a 3D model to a pixel block of a 2D image, according to continuous-mapping embodiments of the invention.

A vertical raster scan order is shown in FIG. 9 for an 8×8 block (other block sizes may be considered), which scans the image column by column, one column at a time always in the same direction (up to down). Also a horizontal raster scan order exists that scans the image line by line.

An advantage of using such a raster scan order compared to using the zigzag scan order of FIG. 8 is a more constant spatial distance between the pixels in the 2D image and the colour values in the scanning path of the 3D model (1D list).

On one hand (zigzag scan mapping of FIG. 8), if we consider the first pixel of the block/first line (801) and the first pixel of the second line (818), their "corresponding" spatial distance in the 3D model (i.e. the spatial distance of the corresponding mapped colour values in the scanning path) is equal to 15.

Also if we consider the last pixel of the first line (808) and the last pixel of the second line (811), their "corresponding" spatial distance in the 3D model is equal to only 1.

This variation of the "corresponding" spatial distances in the 3D model creates large differences between neighbouring pixels, which generate more frequencies in the frequency domain. As these frequencies are not deleted with the quantification, they require bits for their encoding, as many sets of encoding bits as the number of frequencies added. The compression ratio resulting from the encoding is thus degraded.

On the other hand (raster scan order of FIG. 9 or corresponding horizontal one), the "corresponding" spatial distance between the first pixel of the block (901) and the second pixel of the line (911) is 8 as all "corresponding" spatial distances between pixels of the first row and pixels of the second row. In particular, the "corresponding" spatial distance between last pixels 908 and 918 in rows is also 8.

This smoothed "corresponding" spatial distance is statistically reported in the frequencies domain. For DCT-based image codecs or video codecs (i.e. which are based on a spatial-to-frequency transform of pixel blocks, e.g. such as the DCT).

Figure 10:
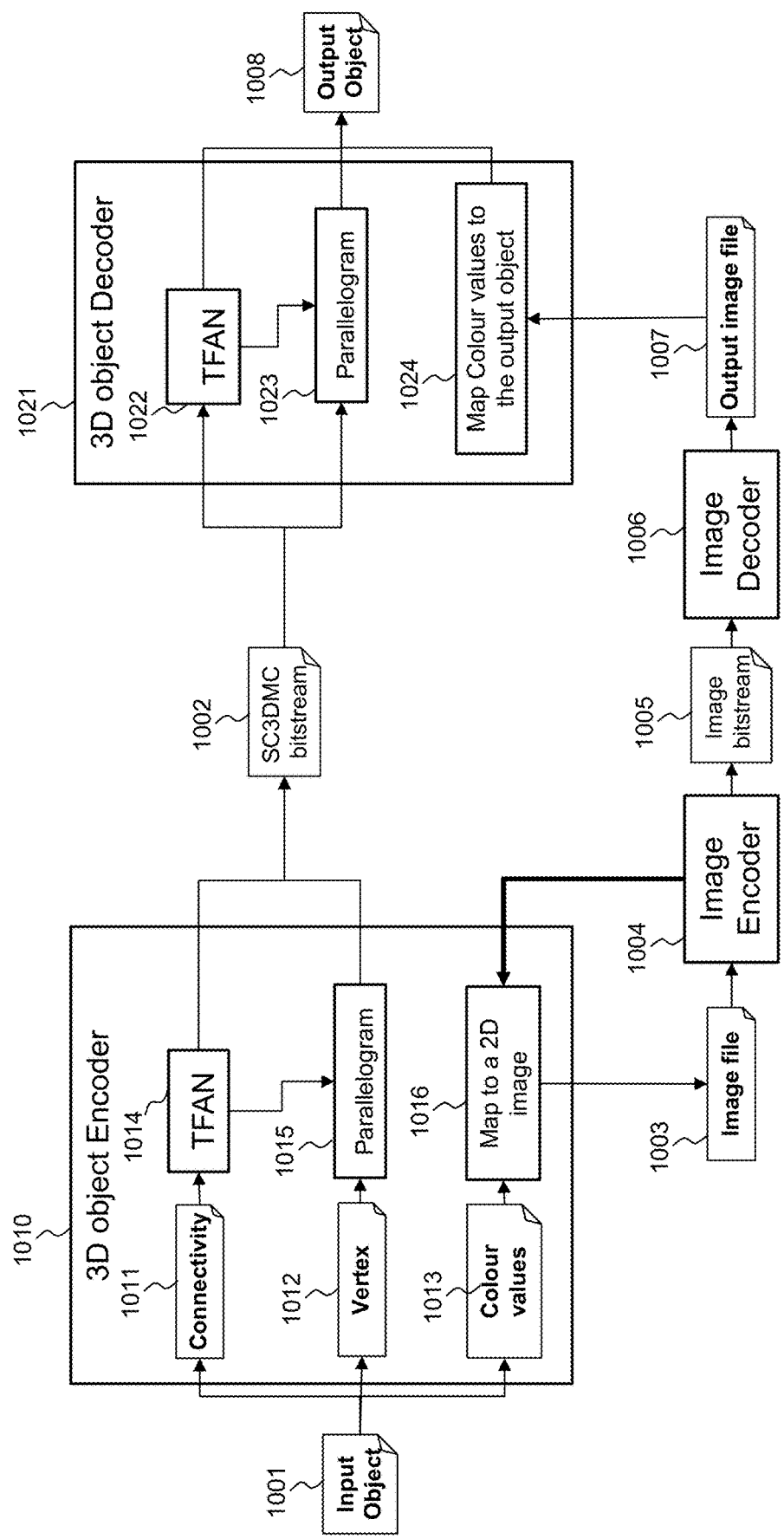
FIG. 10 shows an exemplary codec to implement these embodiments of the invention.

FIG. 10 shows an exemplary codec illustrating the principle of the coding of a 3D mesh object with the second embodiments of the invention. In case of point cloud, no connectivity is encoded, and "points" are synonymous to "vertices".

An input 3D object 1001, as a WRL file or a PLY file or another raw type of 3D object, is encoded with the proposed 3D object encoder 1010.

If the input 3D object 1001 contains connectivity data 1011, these data are encoded 1014 using conventional techniques, for example with the TFAN algorithm or with the Touma and Gostman algorithm, to obtain a sub-bitstream 1002 (e.g. a SC3DMC sub-bitstream).

The geometry data describing the vertices or points 1012 in the 3D model are encoded 1015 a sub-bitstream 1002 (e.g. a SC3DMC sub-bitstream). As an example, the parallelogram prediction, based on the connectivity data, may be used to predict the vertex geometry data (vertex position).

Next, the colour values 1013 (or any attribute value) are mapped 1016 to a 2D image 1003. Whatever the input data (mesh or point cloud), the colour values in the 1D list made by the scanning path order should be correlated, because the compression algorithm of mesh or point cloud goes through the vertices or points according to their neighbours. The mapping of the invention takes advantage of this existing. A mapping based on a raster scan order in the 2D image is thus used.

Note that the mapping 1016 may take into account characteristics and tools of the image or video encoder 1004, as shown by the arrow between 1004 and 1016.

This is why the raster scan order according to embodiments of the invention is a vertical raster scan order, thus fitting with properties of some image or video codecs.

Of course, for other image or video codecs, the raster scan order may be a horizontal raster scan order, as shown in FIG. 9.

Indeed, the advantage of using one or the other of the vertical and horizontal raster scan orders mainly depends on the codec.

For the well-known JPEG codec, the vertical raster scan order appears to be more suitable, as it should reduce the size of the bitstream.

Figure 11B:
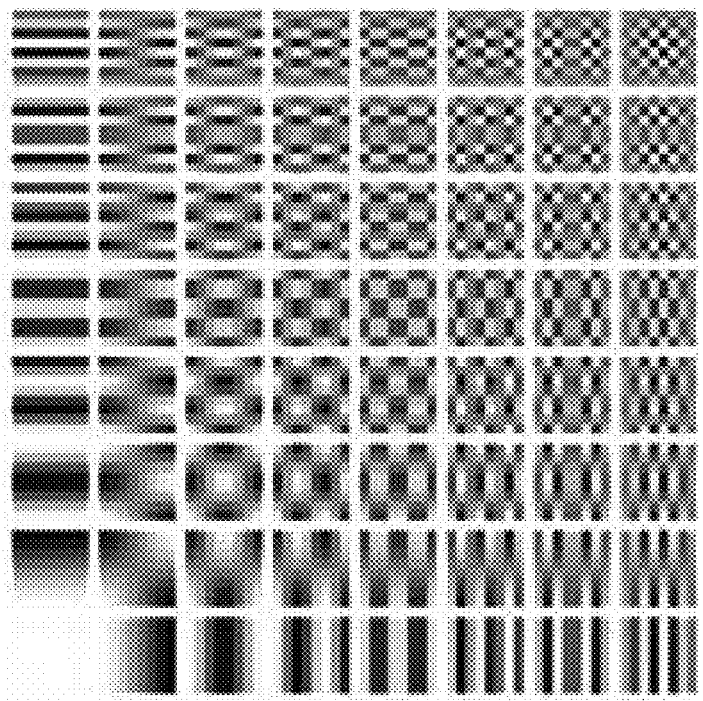
FIGS. 11a and 11b illustrate a zigzag scanning in the JPEG codec and its impact on the frequencies.
Figure 11A:
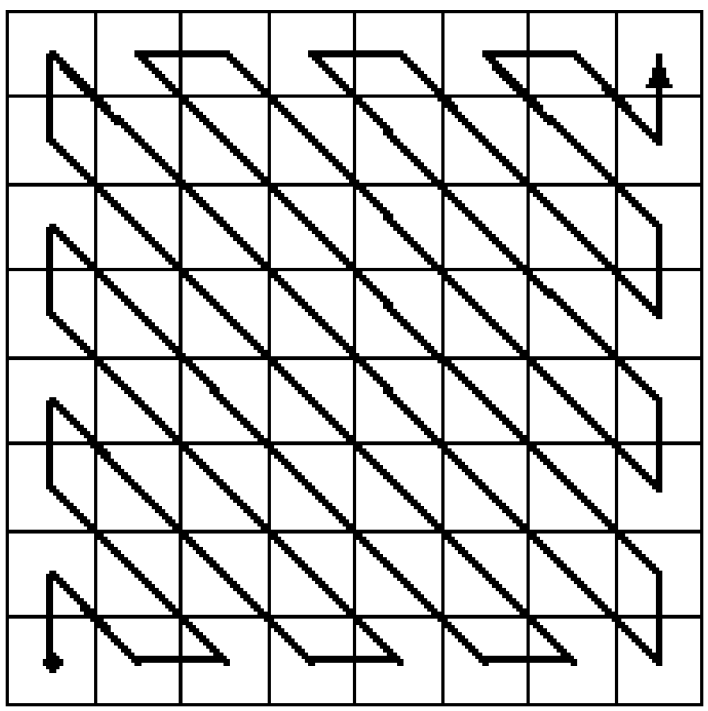

This is because, on one hand, with the vertical raster scan order proposed in the present embodiments of the invention, the DCT transform of such a block should statistically contain more and higher vertical frequencies than horizontal frequencies (as the colours of the 1D list are correlated with their neighbours). And on the other hand, the JPEG codec provides that the vertical frequencies in the frequency domain as shown in FIG. 11 (see top line of FIG. 11b) are coded earlier than the horizontal frequencies (see left column) according to a zigzag scan order as depicted in FIG. 11a. The vertical raster scan order thus matches the properties of JPEG or the like codecs.

In some embodiments also relying on image or video codec's properties, in particular when the codecs are block-based codecs (meaning they perform operations [transform, quantization, etc.] on a block basis), the 2D image may be split into image blocks, and the raster scan order may be used for said mapping of attribute values to pixels within one or more image blocks of the 2D image, preferably within each image block. In other words, the mapping is based on a block structure that preferably matches the block structure of the codec. As an example, a block size of 8×8 is used with the JPEG codec.

Back to FIG. 10, the mapped 2D image 1003 is then encoded by image or video encoder 1004. A sub-bitstream 1005 is obtained.

On the other side, a decoder 1021 receives a bitstream (e.g. made of the SC3DMC sub-bitstreams and of the sub-bitstream 1005), from which it extracts and decodes the connectivity data 1022 and the geometry data (e.g. vertex positions) 1023.

The compliant image or video decoder 1006 extracts the output mapped 2D image 1007, in particular after decoding.

Next, the 3D object decoder maps 1024 the pixels of the output mapped 2D image 1007 to the colour values of the corresponding vertices in the 3D object.

By merging the connectivity data, the geometry data and the property/attribute data as decoded, the 3D object is rebuilt as an output object 1008.

Additional advantages of using a vertical raster scan order (or horizontal one where appropriate) can be explained with reference to HEVC standard.

In HEVC or in other advance video codecs, the pixels of a block (in the mapped 2D image) are predicted by pixels already encoded or decoded. Moreover, for these codecs, several block sizes can be used in the same image.

For such codecs, it may be interesting to keep "corresponding" spatial redundancies between blocks and particularly between adjacent blocks in the 2D image.

In this context, the vertical raster scan order is interesting when a horizontal raster scan order of the blocks is used. In other words, the image blocks of the 2D image are successively considered for said mapping, using a raster scan order (here horizontal) different from the raster scan order (here vertical) used to map attribute values to pixels within each image block.

This can be explained with reference to FIG. 9, which shows that the "corresponding" spatial distance between the first block and the next block (partially depicted on the right side—with pixels starting from 981) is low and systematically the same between two successive blocks. In details, the "corresponding" spatial distance between pixel 971 and 981 and all other couples 97$n$ and 98$n$ is equal to 8.

Thus a comparison can be made with the prior art of FIG. 8 where a horizontal zigzag scan order with a horizontal block scan order is used. The difference at the right or left edge of a block is high and the "corresponding" spatial distance between pixels change line after the other line. For instance, the "corresponding" spatial distance between pixel 808 and 8001 is equal to 56 and the "corresponding" spatial difference at the next line, between pixel 811 and 8018, is equal to 70. This varying "corresponding" spatial distance is statistically not efficient for prediction (horizontal prediction) or when both blocks are in the same transform.

This HEVC-based example shows that the raster scan order is selected from a vertical raster scan order and a horizontal raster scan order, based on an encoding method used by the image or video encoder to encode the mapped 2D image into a sub-stream or on a decoding method used by the image or video decoder to decode the sub-stream.

With other image or video codecs, the orientations of the scan orders may be reversed. For instance, when the image or video codec contains Intra prediction or adaptive block size, the blocks are ordered according to a vertical raster scan order within the 2D image, and the 1D list of colour values is mapped to each block within the 2D image following a horizontal raster scan order.

Thus, an orientation of the raster scan order to be used for the mapping may be determined based on the encoding/decoding method used to encode the mapped 2D image.

As indicated above, the block size used for the mapping may be set based on properties of the codec used (e.g. in HEVC, the block size is preferably set to 16×16 pixels). The block size for the mapping may also (or in a variant) depend on an image quality used in the codec (e.g. through the quantization parameters). For instance when the image quality is set to be low, the block size is high. When the image quality is set to be high, the block size is made lower.

When the codec is not block-based or when the block property of the codec is not taken into account, the raster scan order (either vertical or horizontal) may be used at image level to map attribute values to pixels, meaning that no image block is used when the raster scan ordered mapping is performed. This is for example the case with a lossless codec (i.e. no quantization) or with quantization parameters set to be lossless (or near lossless).

To provide the best compression, the 2D image should be efficiently sized. For instance, the 2D image is first created with pre-determined width and height, and then its forming pixels are used to receive the mapped colour values.

In one embodiment, the size of the 2D image for the mapping is determined based on the following pseudo code:

Width=int($\sqrt{(N_{colour})}$-1)

Width=Width+($bLS$-Width % $bLS$);

If(Width*Width<$N_{colour}$)

Width=Width+$bLS$;

Height=Width;

where $N_{colour}$ is the number of colour values in the 1D list (i.e. in the 3D model); bLS is the block size selected.

To be sure that the image size is a multiple of 8 in any case (in particular when the raster scan order is selected at frame level), bLs is at least set equal to 8 (it may be set to 16, 32, and so on.).

A better use of correlations between the colour (or attribute) values to encode/decode the mapped 2D image is offered in the first embodiments mentioned above.

While the continuous mapping of the second embodiments above exploits the redundancies between colour values in the 1D list to improve the encoding of the 2D image, the first embodiments defined above introduce a discontinuous mapping of the 1D list to the 2D image. This is to exploit the correlation between neighbouring vertices in the 3D model (due to connectivity) so that 2D spatial redundancies are increased in the mapped 2D image. By "discontinuous", it is meant the filling of the 2D image usually along a raster scan order, with the attribute values of the 1D list (scanning path) is not continuous. The raster scan order is thus stopped several times, to start again from another point (usually a new line or new column).

The exemplary process explained below with reference to FIGS. 12 to 20 illustrates the coding of attribute values associated with points or vertices in a 3D model. For ease of explanation, the exemplary process is mainly dedicated to the coding of a colour value per vertex in a 3D mesh model composed of polygons such as triangles. Of course, other attribute or property values associated with points in a point cloud of with the vertices or edges or faces can be encoded using the same or a similar approach.

This approach is based on a property of a spiral-like scanning path. Indeed, such a path makes successive turns (or revolutions). Each turn defines a subpath of vertices. Given the spatial construction of a spiral, two successive turns are made of vertices that are neighbours, one from the first turn, the other from the second turn.

A spiral-like scanning path of vertices within the 3D model is thus obtained. A mapping of values of the colour attribute taken by (or associated with) the scanned vertices can be made to a 2D image, the colour attribute value of each scanned vertex being represented by a pixel in the 2D image. Next, the mapped 2D image is encoded into a bitstream, using an image or video encoder.

According to the first embodiments of the invention, the mapping:

splits the spiral-like scanning path to obtain a plurality of path segments. Preferably, each path segment substantially corresponds to an integer number of turns, preferably a single one, within the spiral-like scanning path, assigns path segments to respective lines or columns (depending on how the image must be filled) of the 2D image, and maps the attribute values of consecutive vertices of the path segments to consecutive pixels of the respectively assigned lines or columns.

The decoding method is substantially similar, with reverse roles. For instance, the mapping maps consecutive pixels of lines or columns of the 2D image to attribute values of consecutive vertices of the respectively assigned path segments.

Figure 12:
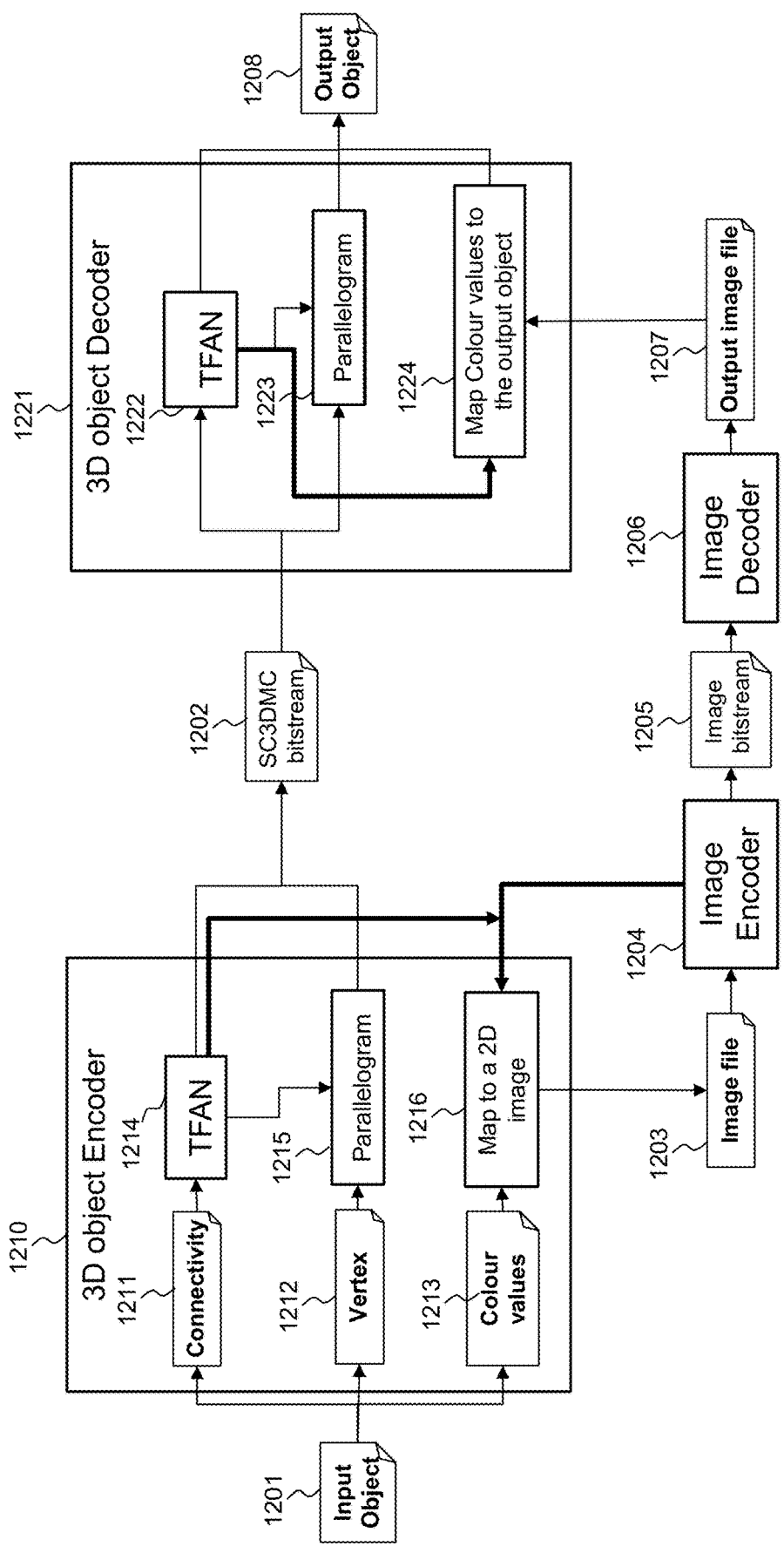
FIG. 12 shows another exemplary codec to implement discontinuous-mapping embodiments of the invention.

The exemplary process is described using the TFAN algorithm as shown in FIG. 12. Other algorithms providing a spiral-like scanning path may be used (for instance polygons or quadrilaterals being used instead of triangles). Also, in the case of a point cloud, any discovery may be used that provides a spiral-like traversal of the points around a first and central point.

FIG. 12 is the same as FIG. 10 except that the mapping 1216 and the inverse mapping process 1224 are based on the parsing (i.e. spiral-like scanning path) of vertices given by the TFAN algorithm 1214/1222.

The parsing of vertices with the TFAN algorithm looks like a spiral around the 3D mesh model in an ideal world. The proposed mapping uses this property to map each turn of the spiral (or couples of turns) in a line (or column) of the 2D image.

FIG. 13, FIG. 14, FIG. 15 and FIG. 16 show the flow chart of the proposed parsing, building the path segments each corresponding to a single turn in the spiral-like path. The same process is applied at encoder and decoder sides.

This parsing is similar to the one used to encode the geometry data or property data as described above depicted in FIG. 7.

To allow the path segments to be built, additional variables are used.

Variable "Last" identifies a vertex ending a line (or column) in the 2D image.

Boolean variable "NextCodedVertexIslast" defines when the current line (column) is finished (value set to True) or not (value set to False).

Boolean variable "SetNextAddedVertex" is used to indicate when the next vertex position not yet parsed can be considered as the first vertex position of the next line (column).

Variable "EndLine[ ]" is a list of the same size as the number of vertices (along the spiral-like scanning path). The end of each path segment is identified in this variable by a value set to True: when "EndLine[i]" is equal to True, it is considered that the $i^{th}$ colour value along the scanning path is the last value of a current line.

Variable "CountRow" gives the number of pixels for the line currently considered (a variable "CountColumn" could be used in case the filling of the 2D image is performed column by column)

In an initialization step 1300, "Last" is set equal to the first vertex of the input list 605; "NextCodedVertexIslast" is set equal to False; "SetNextAddedVertex" is set equal to True; "EndLine[ ]" is initialized with all values set to False; and "CountRow" is initialized to 0. The current vertex is the first vertex of the input list 605.

All fan portions (see FIG. 5a) are successively considered through steps 1301, 1302 and 1319. Vertex 'a' is set equal to the first vertex of the fan portion 1303.

If variable "Last" is equal to a, then variable "NextCodedVertexIslast" is set equal to true at step 1304, meaning that the current line (or column) is finished.

Figure 14:
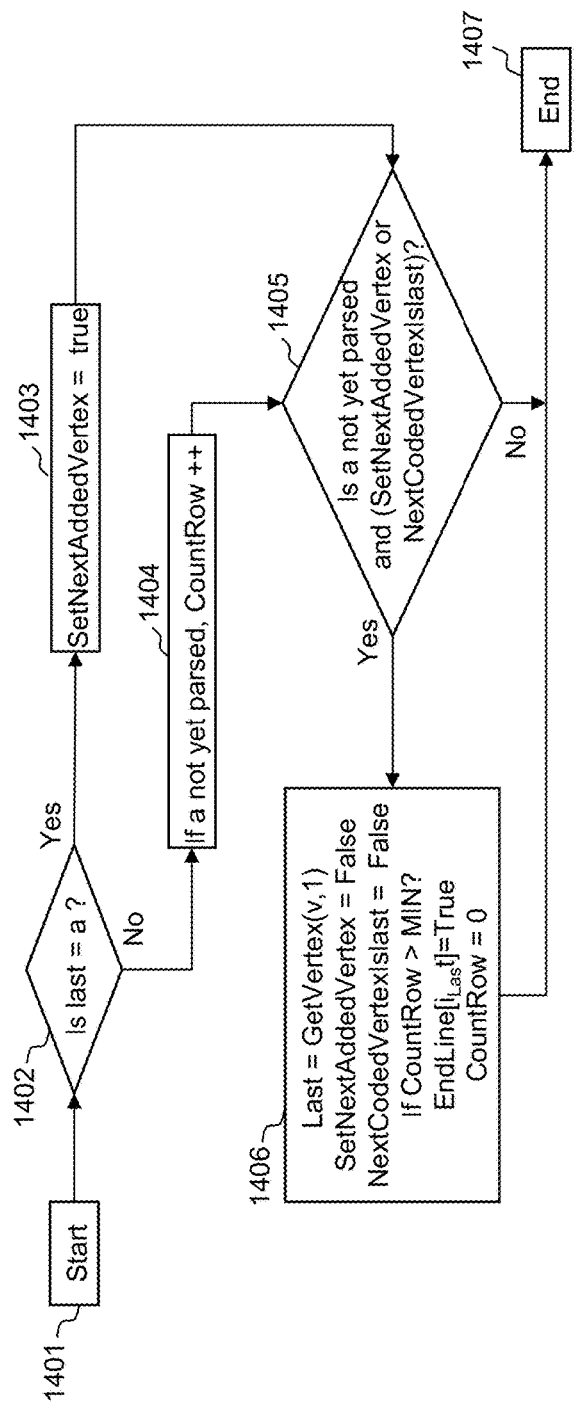
FIG. 14 illustrates, using a flowchart, steps of processing a first vertex of a fan portion, during the process of FIG. 13.

Next the process of FIG. 14 is performed at step 1305 to either continue the current line (by incrementing CountRow—corresponds to the most frequent situations) or define the start of a next line.

In particular, if variable "Last" is equal to 'a' at test 1402, variable "SetNextAddedVertex" is set equal to True to indicate the next added vertex will start a new line in the output 2D image.

Otherwise, if 'a' is not equal to "Last" and 'a' has not yet been parsed (i.e. not already considered as a centre point of fan portions), "CountRow" is incremented by one at step 1404.

Next, if 'a' is not parsed and a new line must be defined ("SetNextAddedVertex" or "NextCodedVertexIslast" equal to 1—test 1405), "Last" is set equal to GetVertex(v,1), the next discovered vertex given the connectivity data, and "NextCodedVertexIslast" and "SetNextAddedVertex" are reset to False. This is step 1406.

Next, CountRow is reset to 0 as a new line (or column) will start.

Optionally, if the number of colour values in the current line is too small (thereby resulting in a too small line), the current line is continued with the next turn in the spiral-like path. It means that several path segments may be made of a different number of turns in the spiral-like path. This option efficiently increases the filling of the 2D image, in particular for the beginning of the 3D model scanning where the turns are made of few vertices, or for specific distorted areas in the 3D model where the scanning path locally departs from a spiral shape.

This option is shown in step 1406 where "CountRow" is compared to a threshold "MIN". For instance, MIN=10. However other integer values may be used.

If "CountRow" is higher than "MIN", meaning the number of pixels in the current line is not too small, the vertex specified in "Last" (here vertex b) corresponds to the last colour value added to the current line. As a consequence, "EndLine[$i_{Last}$]" is set equal to True ($i_{Last}$ is the position of Last in the spiral-like path), and a new line can start with the reset of CountRow to 0.

Note that in this particular case, 'b' is set to be the last vertex of the path segment (and not a) because a will never be parsed again, as it is currently being parsed (since it is the centre of the fan).

If "CountRow" is less than "MIN", the process continues with the same current line.

When exiting from the process of FIG. 14, vertex 'a' is now considered as parsed (step 1306).

As known, 'a' is the centre of a fan portion currently considered. At the beginning of the decomposition shown in FIG. 5a, $V_1$ is first considered, which immediately defines $V_2$ as the next "Last".

In most situations, the centre of a fan portion is not the "Last", as plenty of fan portions are successively considered before a turn in the spiral is done.

In some situations, the centre of a fan portion matches the "Last". For example, $V_2$ is set to be the "Last" when processing $V_1$ (step 1406) and then when processing $V_2$ as 'b' for first time (step 1506 below), meaning $V_2$ has already been "parsed" (step 1309 below). In that case, the process of FIG. 14 when $a=V_2$ sets SetNextAddedVertex to True (test 1402 is positive: Last=$V_2$), but updating step 1406 is not performed since $V_2$ has already been parsed.

Similarly, $V_9$ may be the "Last" (after $V_2$—see below). $V_9$ has been discovered when processing the fan portion $T_7$-$T_{10}$, meaning $V_9$ has already been "parsed" (step 1317 below). In that case, the process of FIG. 14 when $a=V_9$ sets SetNextAddedVertex to True (test 1402 is positive), but updating step 1406 is not performed since $V_9$ has already been parsed.

Figure 15:
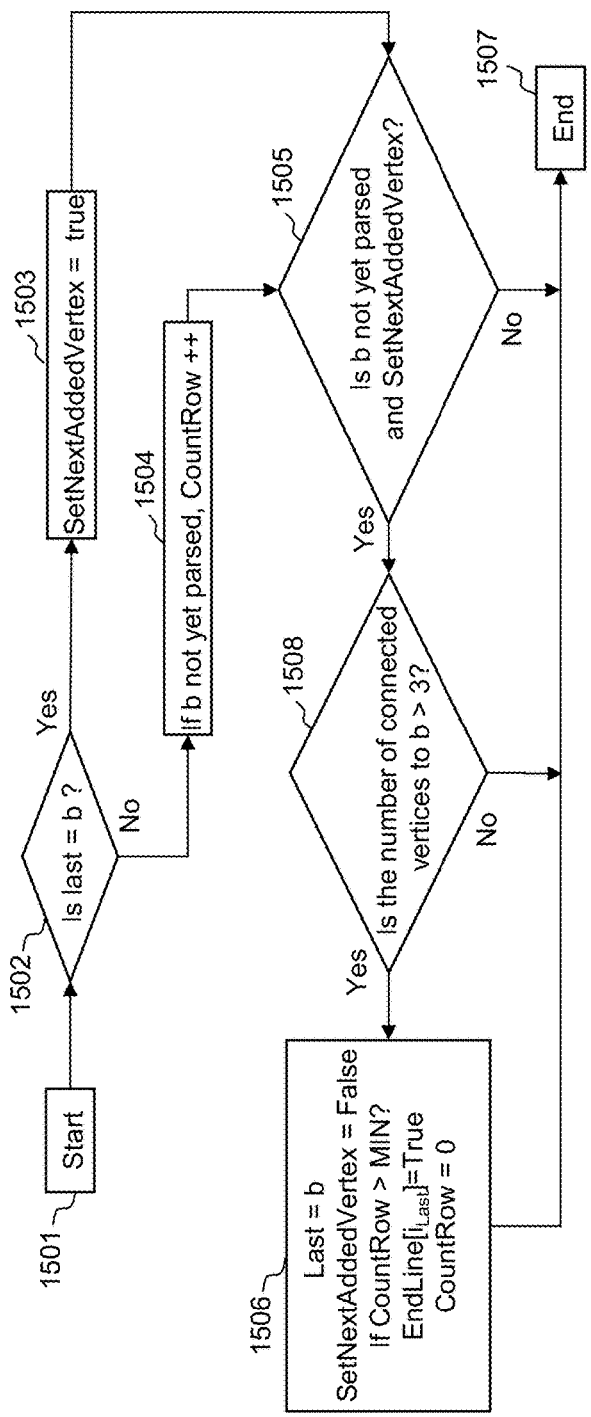
FIG. 15 illustrates, using a flowchart, steps of processing a second vertex of a fan portion, during the process of FIG. 13.

Next, the second vertex 'b' of the fan portion is retrieved at step 1307, and the process of FIG. 15, quite similar to the one of FIG. 14, is applied during step 1308, to either continue the current line (by incrementing CountRow—it corresponds to the most frequent situations) or define the start of a next line (specific situation of the second vertex of a 3D object, e.g. $V_2$).

Compared to the process of FIG. 14, module 1505 applies a modified condition where "NextCodedVertexIslast" is not tested. Similarly, step 1506 does not update this variable.

Also, when 'b' is the "Last" (test 1502) and not yet parsed (test 1505), if the number of connected vertices to 'b' is strictly superior to 3 (to ensure a third vertex, additional to the two ones having allowed vertex 'b' to be discovered, can be used as a new vertex ending a path segment), 'b' can again be set as the last point of the next (or current) line. It means that the turn in the spiral-like path or the current line will end upon reaching vertex 'b' for another time.

Still referring to FIG. 5a, 'b' has usually already been parsed (except for the second vertex $V_2$ of the 3D object), because the first non-central vertex of a fan portion always belongs to an already processed triangle (see $V_8$ being vertex 'b' for $a=V_2$ while $V_2$-$V_8$ have been discovered [and thus parsed] when processing the fan centred on $V_1$; see also $V_{11}$ being vertex 'b' for $a=V_3$ while $V_9$-$V_{11}$ have been discovered [and thus parsed] when processing the fan centred on $V_2$).

When exiting from the process of FIG. 15, vertex 'b' is now considered as parsed (step 1309).

Figure 16:
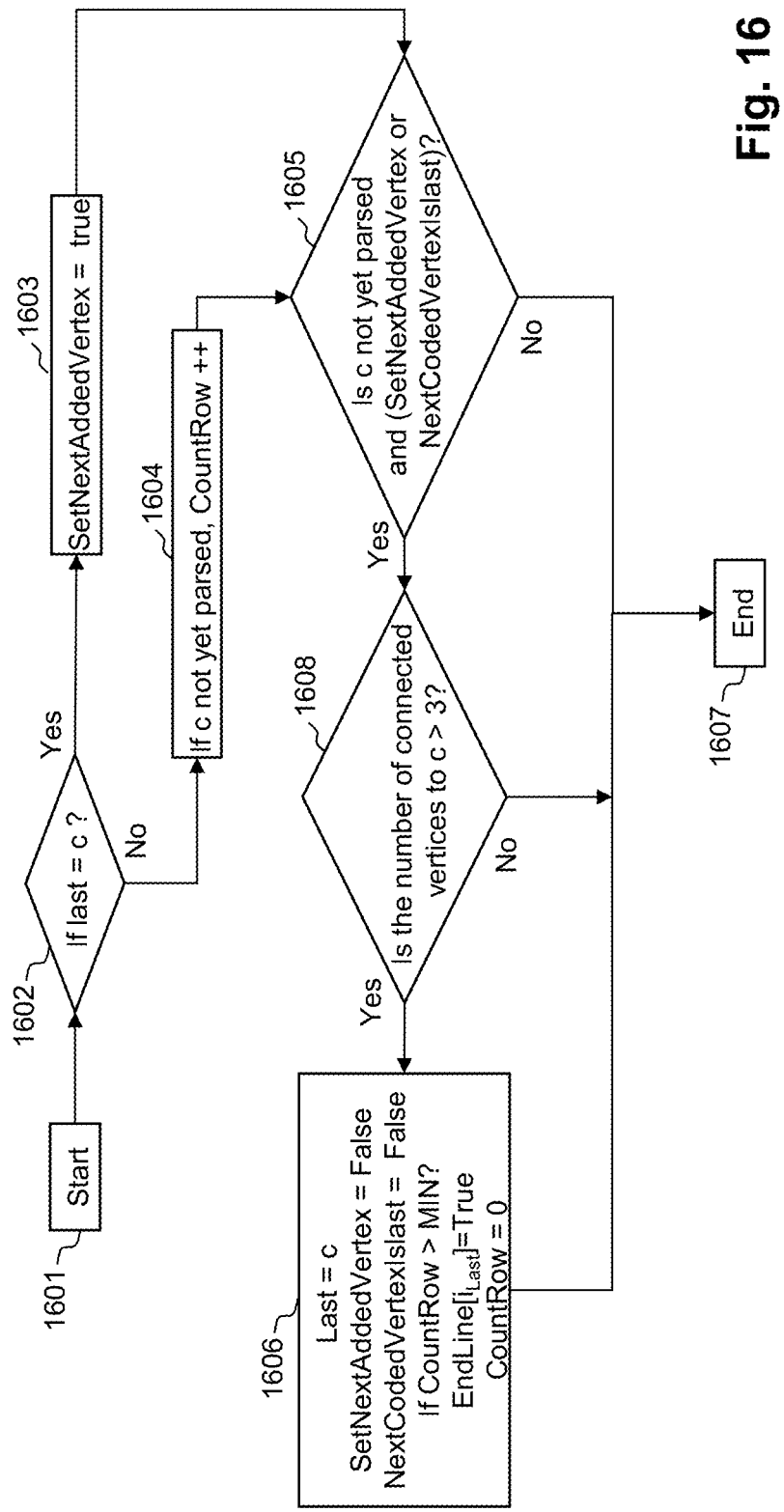
FIG. 16 illustrates, using a flowchart, steps of processing a third vertex of a fan portion, during the process of FIG. 13.

Next, the third vertex 'c' of the fan portion is retrieved at step 1310, and the process of FIG. 16, quite similar to the one of FIG. 15, is applied during step 1311, to either continue the current line (by incrementing CountRow—it corresponds to the most frequent situations) or define the start of a next line in the 2D image.

Compared to the process of FIG. 15, modules 1605 and 1606 reintegrate the operations on "NextCodedVertexIslast" (meaning they correspond to modules 1405 and 1406).

Next, the others vertices of the fan portion v are parsed in the loop 1314-1318. The vertex positions k are successively processed in the same way as vertex 'a' (FIG. 14) except that "Last" is not set equal to GetVertex(v,1) but to the current vertex d at step 1406.

The process for vertices 'c' and 'd' means that a new 'Last' is defined as the current vertex each time this current vertex has not yet been parsed (i.e. it is just discovered) and one of SetNextAddedVertex and NextCodedVertexIslast is set to True (usually SetNextAddedVertex, meaning the previously "Last" has yet been encountered). In other words, the next "Last" is set to the first newly discovered vertex, once the previous "Last" has been encountered.

Still referring to the example of FIG. 5a, when $a=V_2$, SetNextAddedVertex is set to True at step 1403. The next discovered vertex is $V_9$ ($V_3$-$V_8$ have already been discovered when processing the fan centred on $V_1$), which is thus set as being the next "Last" at step 1606. Thus a path segment is made of $V_2$ to $V_9$ (if large enough).

Similarly, when $a=V_9$ (the next time $V_9$ is encountered), SetNextAddedVertex is set to True at step 1403 because Last=$V_9$. The next discovered vertex from centre vertex $V_9$ is $V_{24}$ ($V_{22}$-$V_{23}$ have already been discovered when processing the fan portion centred on $V_8$), which is thus set as being the next "Last" at step 1606. Thus a next path segment is made of $V_9$ to $V_{24}$ (if large enough). The double line in FIG. 5a shows how the spiral-like path is cut into segments. Each build path segment substantially corresponds to a single turn in the spiral.

The loop 1301-1319 thus progressively splits the spiral-like path into a plurality of path segments. Each one will be associated with/assigned to a line of the 2D image, as explained below.

When all fan portions v have been parsed (test 1301), the remaining vertices, i.e. isolated vertices 1320, are processed. In particular, the isolated vertices are mapped to pixels of one or more additional (additional to the lines or columns already defined for the connected vertices, i.e. already assigned to path segments splitting the spiral-like path) lines or columns of the 2D image.

Figure 13:
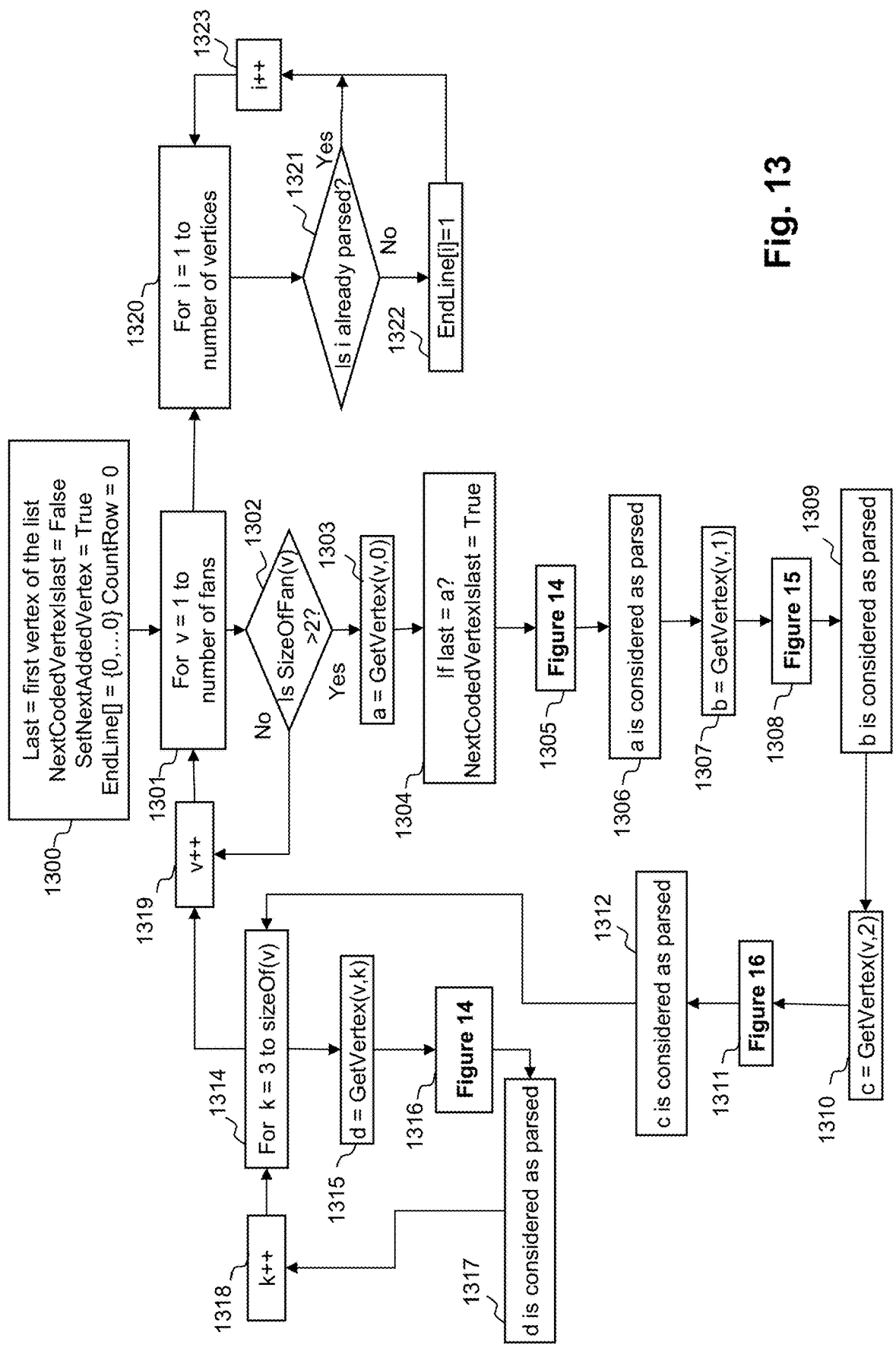
FIG. 13 illustrates, using a flowchart, general steps of encoding property data, such as colour attribute values, according to discontinuous-mapping embodiments of the invention.

In one embodiment, as shown in FIG. 13, the isolated vertices are in one line each, by setting EndLine[i] to True for each isolated vertex not yet parsed, at step 1322. Resulting from this embodiment, the isolated vertices will be each mapped to a pixel of a respective dedicated additional line or column of the 2D image.

In a variant, the isolated vertices may be mapped to pixels of one and the same additional line or column of the 2D image, meaning that all the remaining vertices are assigned to the same line. In the process of FIG. 13, it means that, in the loop 1320-1323, EndLine[i] is set to True only for i=$N_{colour}$ (i.e. the number of vertices).

Of course, other embodiments may be contemplated that provide an intermediary situation in which the isolated vertices are mapped to pixels of one or more additional lines or columns to fill them completely when possible, the one or more additional lines or columns having for instance a length equal to the maximum length, in terms of number of vertices, of the path segments already built. It requires, for the loop 1320-1323, to first determine the maximum length $L_{MAX}$ of a line already built (i.e. the maximum space between two consecutive EndLine[ ] set to True), and then to set, at step 1322, End Line[ ] to True only each $L_{MAX}$ non-parsed isolated vertices.

At the end of FIG. 13, EndLine[ ] is set and can be used to determine the size of the 2D image for the mapping. This variable EndLine[ ] is the only variable transmitted to the mapping processes in order to size the image accordingly.

Thus, the 2D image is sized with a first dimension (height or width) set based on a number of assigned lines or columns (i.e. built during the loops 1301-1319) and possibly one or more additional lines or columns to map a set of isolated vertices (as built during the loops 1320-1323), and with a second dimension (width or height) set based on the maximum length, in terms of number of vertices, of the assigned path segments and possibly of the set of isolated vertices.

In other words, the size of the 2D image is determined, in which for instance the image height is equal to the number of times the variable "EndLine" is equal to true; and the image width is set equal to the maximum distance between two consecutive "EndLine[i]" equal to True. This is simple to implement.

In a variant, the first dimension is built in the same way, but the second dimension (width or height) may be set based on a ratio between the number of scanned vertices having the attribute considered (colour attribute in our examples) and this number of assigned and possible additional lines or columns. This optimal image size provides exactly one pixel in the 2D image for each vertex having the attribute considered. Thus no unused pixel will remain in the 2D image after ending the mapping, thereby reducing the coding cost of the 2D image.

One understands that this optimal sizing results in having some lines (or columns) with a length that is less than the number of vertices of the assigned path segment (i.e. less than the number of colour values to be mapped to the line). Some path segments will thus be truncated as explained below and filled in other lines, thus losing some spatial correlations. So in one embodiment, when the codec cannot code very efficiently large amount of uniform areas as JPEG, the optimal image size embodiment is activated. On the other hand, when the codec can code efficiently a large uniform area, as for example HEVC, the proposed optimal image sizing is not activated, and the other size calculation proposed above may be used.

In any embodiment, the image height and width can be rounded to the nearest greater multiple of a predefined number corresponding to a size of blocks considered by the image or video encoder, in particular a multiple of 8.

Once EndLine[ ] is set and the image size is known, the actual mapping may be performed.

Figure 17:
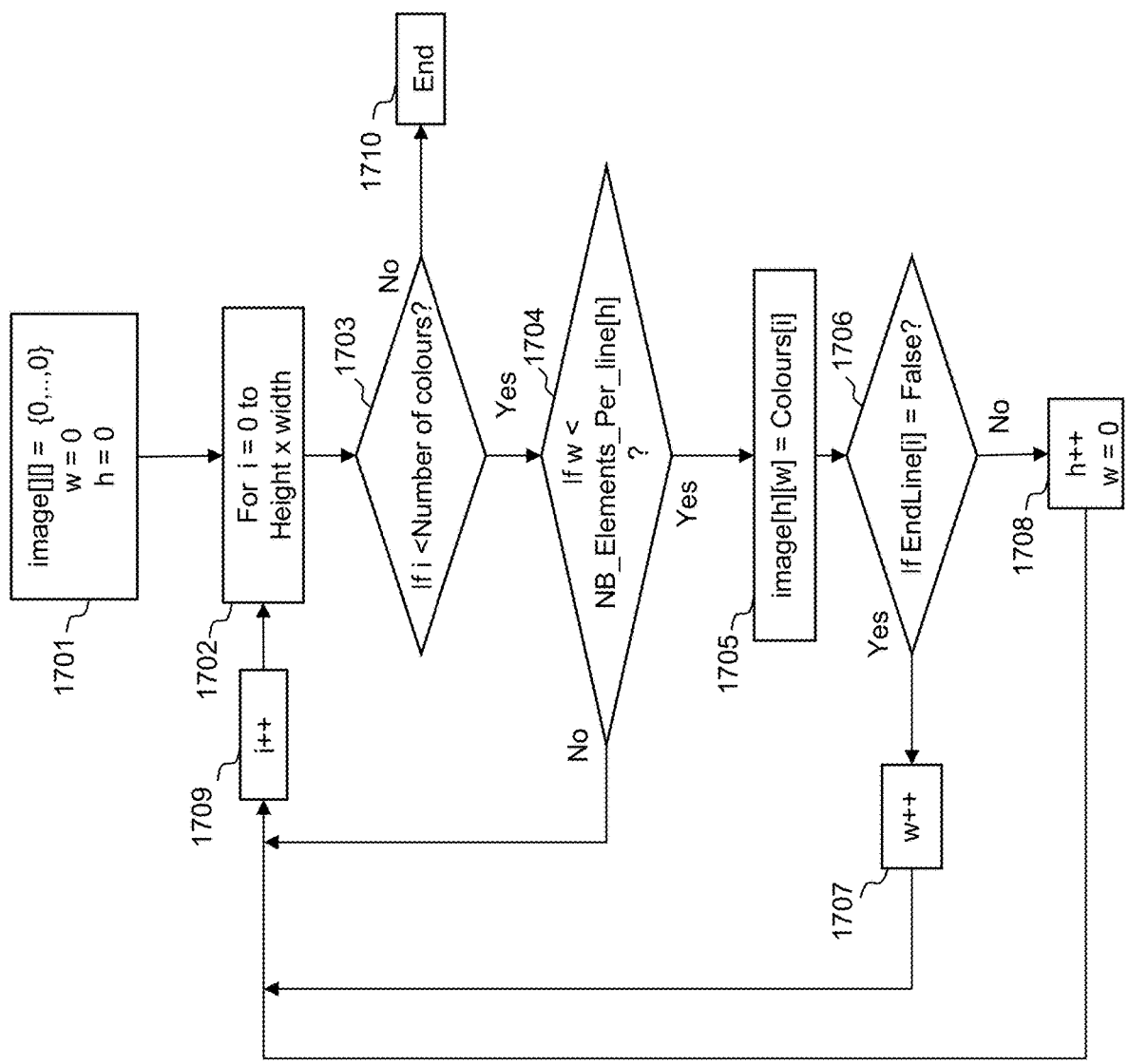
FIG. 17 illustrates, using a flowchart, steps of an exemplary first mapping loop to map attribute values to a 2D image, according to discontinuous-mapping embodiments of the invention.

FIG. 17 illustrates, using a flow chart, an exemplary embodiment of the actual mapping. The process uses additional variables, including:

variable "NB_Elements_Per_line[ ]" is set to contain the number of pixels for each line. It contains as many entries as the number of lines defined by EndLine;

variable "image[ ][ ]", defining the 2D image for the mapping with determined width and height, each element containing an RGB pixel.

At initialization step 1701, variables "NB_Elements_Per_line[ ]" and "image[ ][ ]" are initialized.

The number "NB_Elements_Per_line[ ]" of pixels for each line is defined by the distance between two consecutive EndLine[ ] set to True, i.e. the number of "EndLine[i] " equal to False+1 between two consecutive "EndLine[i]" equal to True.

Each element of "image[ ][ ]" is set equal to a by-default value, e.g. (0,0,0) or (−1,−1,−1) which is not a value per se. This initialization makes it possible to perform the mapping on a 2D image full of pixels initially set with a by-default pixel value.

Also, variables w and h to scan all pixel positions in the 2D image are set to 0.

The core of the process thus starts by considering each colour value to be mapped. This is done by setting variable i from 0 to the size of the 2D image (height×width) (step 1702), while checking if i is less than the number of colour values ($N_{colour}$) or not (test 1703).

If it is equal or higher than the number of colour values, it means that all the colour values have been processed, and the process can thus end (step 1710).

Otherwise, additional colour values need to be mapped.

If w is less than the number of elements for the current line, as defined by NB_Elements_Per_line[h] (test 1704), the pixel of the 2D image at position (h, w) is set equal to the colour value of the vertex in the $i^{th}$ position in the spiral-like path (i.e. the $i^{th}$ colour value in the corresponding 1D list Colours[ ] of colours). This is step 1705: image[h][w]=Colours[i].

This is done for each colour value for the current line (test 1706 checking that "Endline[i]" is still False, in which case the next colour value is processed by incrementing w [for the next pixel in the line] at step 1707 and looping back to step 1709 to increment i).

Once the current line ends (EndLine[i] set to True at test 1706), a new line is considered by incrementing variable "h" and resetting "w" to 0 (1708). The next colour value is then considered by looping back to step 1709 to increment i.

At the end of the process, the 2D image contains all RGB colours and some pixels (0,0,0) not used at the end of one or more lines. Of course, the roles of lines and columns may be swapped (variables h and w play opposite roles) in order to fill the 2D image column by column, instead of line by line.

FIG. 5a illustrates this. As explained above, the thick spiral-like path $V_1, V_2, V_3, V_4, V_5, \ldots, V_{23}, V_{24}, V_{25}$ is obtained, and each spiral turn is identified: $V_1$-$V_2$, then $V_2$ to $V_9$, then $V_9$ to $V_{24}$, and so on. Each path segment is mapped to a line in the 2D image. The first line of the 2D image thus includes the colour values $C_1$ and $C_2$ of vertices $V_1$ and $V_2$; the second line includes the colour values $C_3$ to $C_9$ of vertices $V_3$ to $V_9$; the third line includes the colour values $C_{10}$ to $C_{24}$ of vertices $V_{10}$ to $V_{24}$; and so on.

Figure 20A:
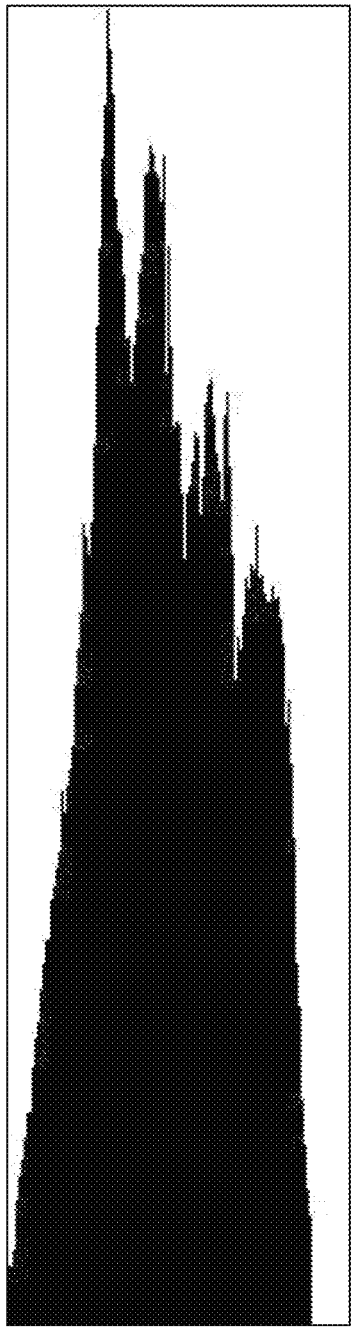
FIGS. 20a, 20b and 20c illustrate a mapped 2D image obtained using discontinuous-mapping embodiments of the invention.

In the proposed algorithm, the mapped pixels are aligned with the start of the respectively assigned lines or columns. Here, the pixels are in the left side of the 2D image, thus forming a kind of "age pyramid" as depicted in FIG. 20a.

In a variant, the mapped pixels may be centred within their respectively assigned lines or columns, e.g. middle-aligned. It means that the lines of colour values are added in the middle of the 2D image. In the process, instead of starting the line from the left to the end of line, the built line is inserted in the 2D image in order that its middle is in the middle of the width of the image.

Figure 20B:
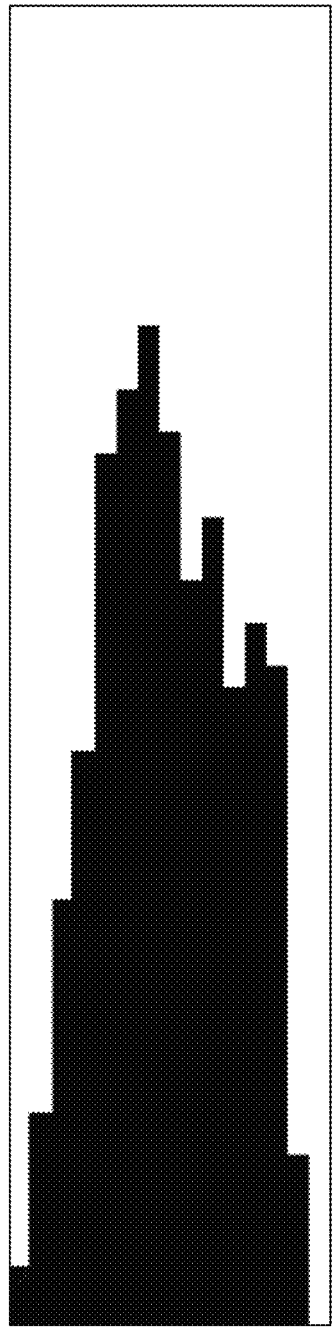
Figure 20C:
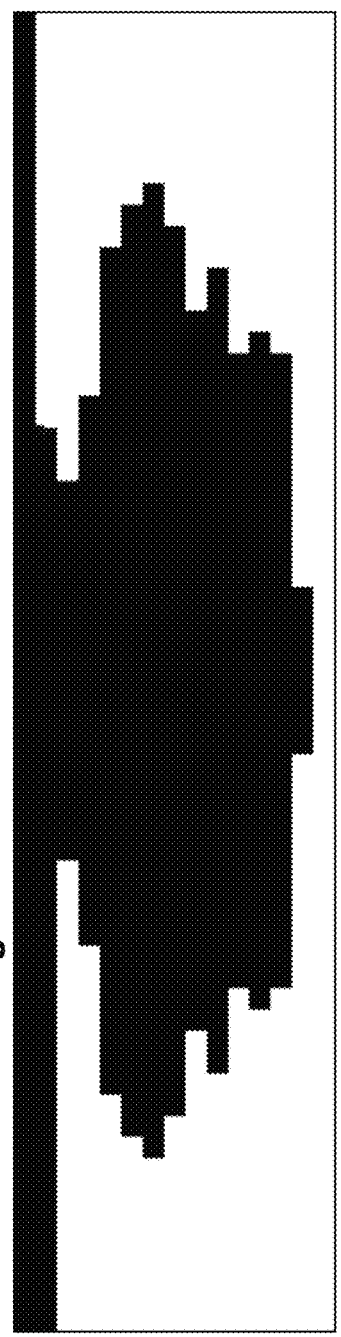

FIG. 20c illustrates an exemplary result of this embodiment. The advantage of this embodiment is an improvement in coding efficiency. Indeed, this mapping increases the spatial correlations between pixels in the mapped 2D image.

For some 3D objects, the generated 2D image is almost perfect with pixels spatially correlated. However, other images may not be perfect as the density of vertices is non uniform to obtain a perfect spiral with the TFAN algorithm.

In one additional embodiment, if the length of the current line is less than for instance half the one of the previous line, the current line is not added at its position in the 2D image. The next line in the image will be a line which contains enough numbers of colour values given the number of the current line. The colour values of the non-added line are then added to pixels during a second loop in the space (i.e. pixels) still available (with the by-default pixel value) after the first loop. It means that, in this additional embodiment, during a first mapping loop, each new path segment is mapped to pixels of a next line or column in the 2D image if the new path segment comprises more vertices having an attribute value than a predefined ratio (here half) of the number of attribute values mapped to the last mapped line or column in the 2D image. Also during a second mapping loop, the attribute values of vertices unmapped during the first mapping loop are mapped to unmapped pixels (i.e. not yet mapped, or remaining with a by-default pixel value) available in the 2D image after the first mapping loop.

Figure 18:
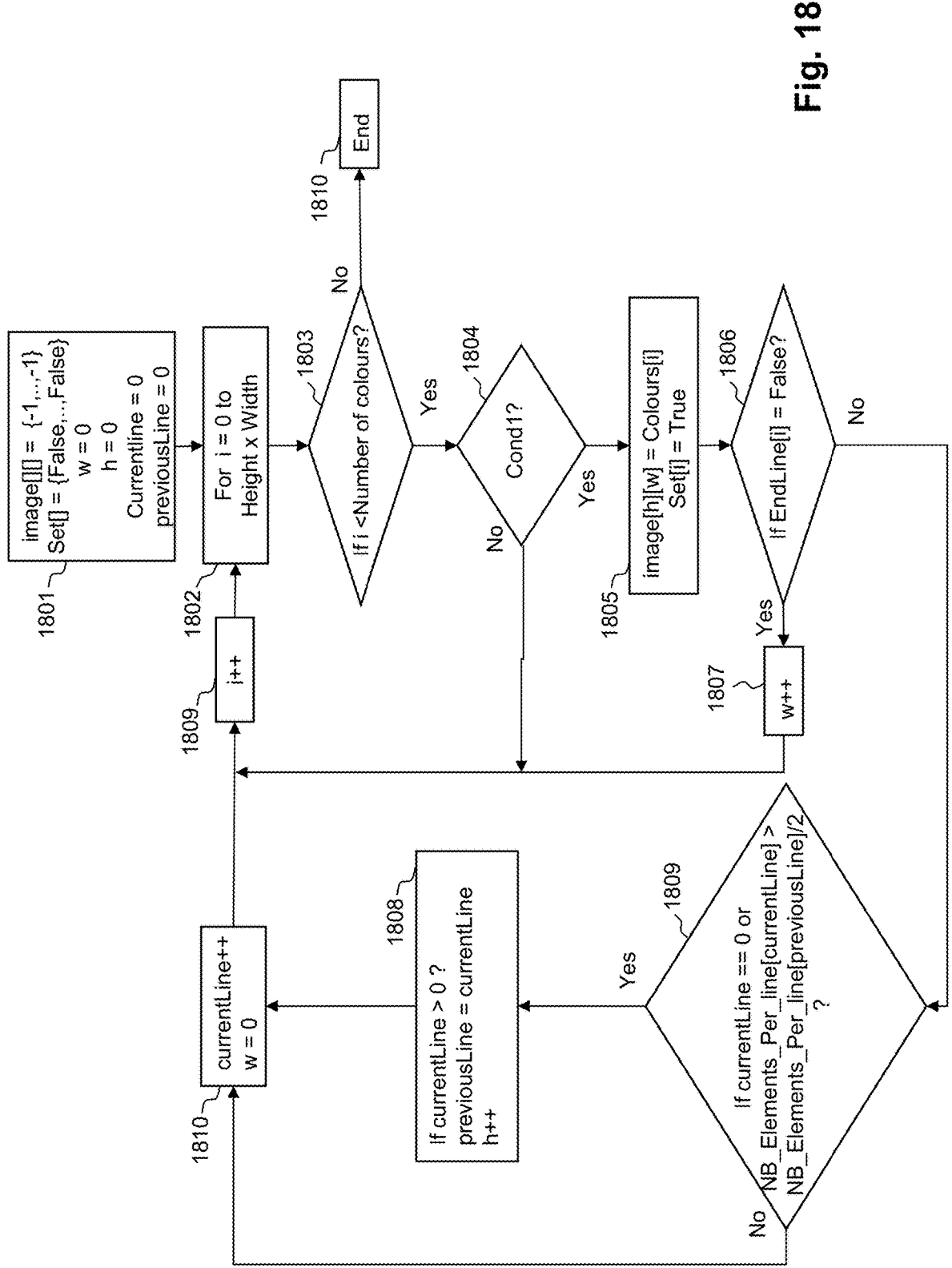
FIG. 18 illustrates, using a flowchart, steps of another exemplary first mapping loop to map attribute values to a 2D image, according to other discontinuous-mapping embodiments of the invention.

FIG. 18 illustrates this additional embodiment, using a flowchart. FIG. 18 is based on FIG. 17.

Three additional variables are used to allow the check of the line length:

variable "CurrentLine" to store the index of the current line, variable "previousLine" to store the index of the previous line, and a table "Set[ ]" of the same size of the list of colour values Colours[ ] which is used to indicate when each $i^{th}$ colour has been set ("Set[i]" is set to True in that case).

These variables are initialized at step 1801 together with image[ ][ ], and w and h.

The condition of 1704 has been changed by the following Cond1 at step 1804:

(currentLine==0 or NB_Elements_Per_line[currentLine]>NB_Elements_Per_line[previousLine]/2).

Of course the division by two may be modified according to the ratio considered.

If the condition is met, image[h][w]=Colours[i] and the variable Set[i] is accordingly to store the fact that Colours[i] is now mapped.

When the current colour value is at the end of the line (test 1806 negative), it is checked that the number of elements for the current line NB_Elements_Per_line[currentLine] is higher than half (or any other ratio) the number of elements of the previous added line, at test 1809. This is to switch to the next line of the 2D image (by incrementing h at step 1808) only if it is true. In that case, the previous line is also set equal to the current one.

Next or if test 1809 is false, the next path segment is considered by incrementing currentLine and a new line in the 2D image can be filled (step 1810).

If the optimized image sizing is activated (thus the 2D image has a predefined line or column length), the process of FIGS. 17 and 18 must be slightly adapted to stop the filling of a line in the 2D image as soon as the end of the line is reached (although the end of the assigned path segment is not reached). Thus, during the first mapping loop, the attribute values of the vertices composing each path segment are mapped to pixels of the respectively assigned line or column, until reaching the end of the line or column.

This may be done for instance by checking that w remains lower than the image width, during step 1704 or 1804. When w reaches the image width, each next colour value should be processed as in step 1706 or 1806, up to EndLine[i]=True. This makes it possible to skip all the colour values until the corresponding path segment ends.

At the end of FIG. 18, if a line has not been added, at least one colour value is not in the image. As mentioned above, such non-added colour values can be mapped to the 2D image during a second loop during which they are mapped to unmapped pixels (i.e. not yet mapped, or remaining with a by-default pixel value) available in the 2D image after the first mapping loop.

Figure 19:
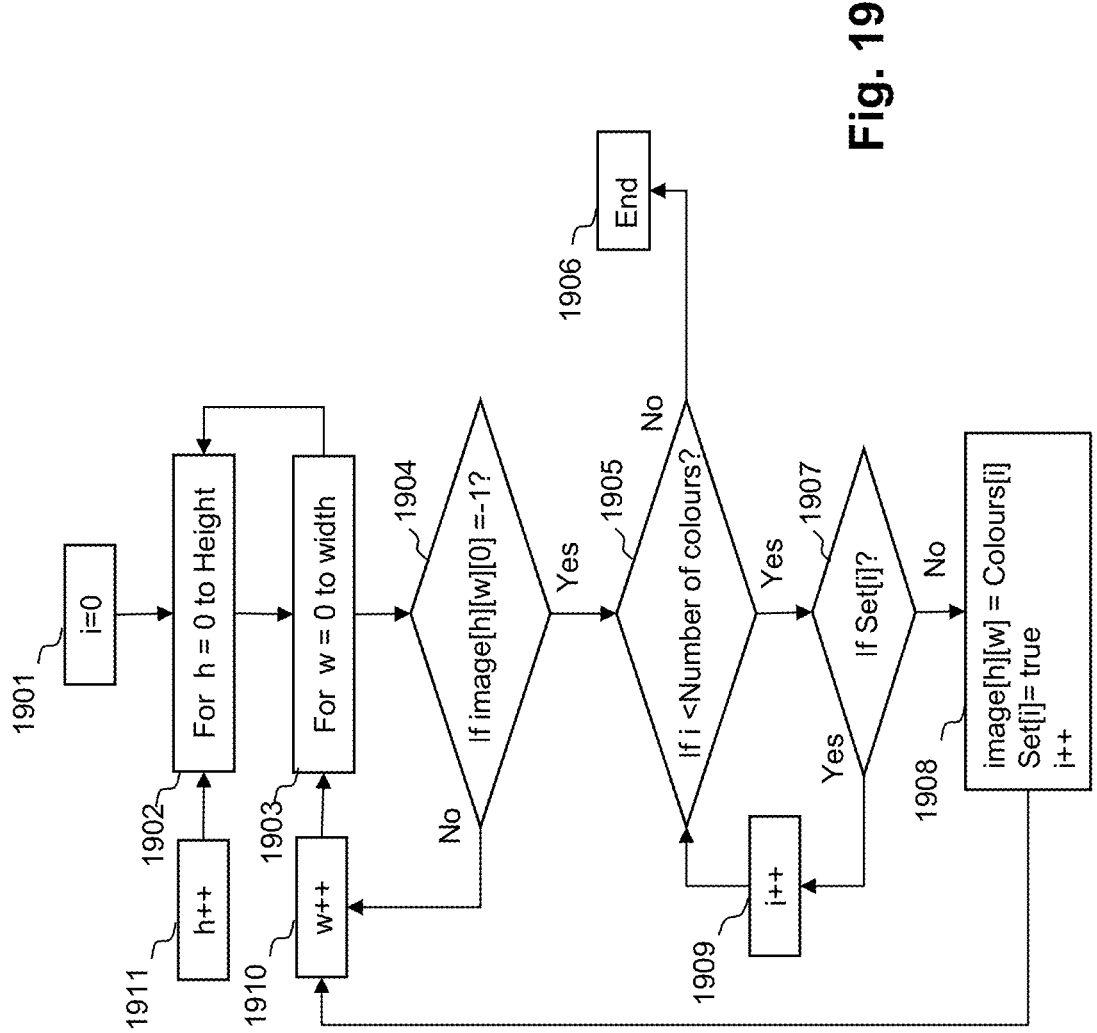
FIG. 19 illustrates, using a flowchart, steps of a second mapping loop to map attribute values unmapped during the first mapping loop of FIG. 17 or 18.

FIG. 19 illustrates, using a flowchart, an exemplary implementation of such a second loop to map the non-added colour values.

The 2D image resulting from the first mapping loop is parsed through steps 1902, 1903, 1910, 1911, in order to find a pixel which contains the by-default pixel value (test 1904), i.e. a pixel available to receive an unmapped colour value. Usually, these unmapped pixels are available in lines or columns already mapped during the first mapping loop, either at the end of the line (with left aligned pixels) or at both ends (in case of middle-aligned pixels).

When such a pixel image[h][w] is found, table "Set" is parsed at steps 1905, 1909, to find a colour value 'i' which is not yet added (test 1907).

If such colour value is found, it is added in 2D image, at the pixel determined as available: image[h][w]=Colours[i]. This is step 1908, where Set[i] is also set to True.

When all the colour values have been added, the process ends (step 1906), and the pixels which still contain the by-default pixel value (−1) are changed into a default colour value, e.g. (0, 0, 0). Of course, if the optimized image sizing is activated, there may be no or very few remaining pixels with the by-default pixel value.

The second mapping loop thus ensures all the colour values to be mapped to the 2D image. In a specific embodiment, the colour values of the isolated vertices (added to specific lines during steps 1320-1323) can be handled only during the second mapping loop. This is because each of them is not very correlated with another one. Thus they can be added at any available pixel location, without incurring additional encoding cost.

Another embodiment is proposed for the mapping that involves truncating the lines (or corresponding path segments). In particular, during the first mapping loop, at least one path segment in the set of path segments is truncated so that the mapping of the attribute values of the vertices remaining in the set of path segments (including the truncated path segment) matches a N×N block grid in the 2D image.

It means that after the first mapping loop of FIG. 17 or FIG. 18, the colour values are in N×N blocks in the 2D image. The colour values truncated by this process are added during the second mapping loop as already described above.

In a preferred embodiment, the default block size N is 8.

FIG. 20b shows these pixels when the lines are truncated in a grid of blocks. FIG. 20c illustrates the same situation with middle-aligned lines of colour values.

The advantage of truncating the path segments is an improvement in coding efficiency. Indeed, for a codec which uses a block structure, the coding of the end of the lines as in FIG. 20a creates high frequencies with the by-default pixel values in white. These additional frequencies require additional bits to be encoded, while they are not needed to be coded for the 3D object.

In sharp contrast, when the lines are truncated as in FIG. 20b or 20c, these high frequencies are only present in a frontier between blocks, thus requiring less coding bits.

This truncating-based embodiment is particularly efficient when the JPEG codec is used due to the independent coding between block.

The same block-based approach may be used for the second mapping loop. In particular, embodiments may provide that the second mapping loop maps unmapped attribute values of vertices to an M×M block (or more) of unmapped pixels in the 2D image. For instance, the second mapping loop maps the unmapped attribute values to an M×M block using a raster scan order.

In this embodiment, the colour values added during the second loop are added in the same way as the continuous mapping described above with reference to FIGS. 9 to 11. It means that the remaining colour values are added in blocks of size M×M, in the space remaining available in the 2D image.

This embodiment also increases coding efficiency for the same reasons.

Preferably, the size M is set to 8 for a JPEG codec, while it may be set to 16 when the codec has an adaptive block size and/or larger block size as HEVC.

In a preferred embodiment using an HEVC codec, the path segments are truncated to match a M×M block-based grid, the mapping to pixels is middle-aligned block in the 2D image, and the second mapping loop maps the colour values by M×M blocks.

The above-described first and second embodiments adapt the mapping of attribute values of a 3D model to a 2D image in order to improve coding efficiency. Some embodiments further adapt it to the type of codec used, for instance through a block-based approach or a vertical or horizontal orientation of the scanning. It means that the mapping of the attribute values to the 2D image may depend on an encoding method used by the image or video encoder to encode the mapped 2D image.

Third embodiments of the present invention seek to improve the efficiency of the coding of a 3D model involving the mapping of attribute values to a 2D image. The third embodiments focus more particularly on the encoding of the mapped 2D image, by selecting some image coding tools that reveal to be of particular efficiency when coding such images.

The inventors have noticed that the 2D images generated by the known mapping or the mappings proposed above (first and second embodiments), and especially the continuous mapping of the second embodiments, contain a lot of similar patterns but not exactly the same. In fact, these patterns look like some small natural images. These images contain high frequencies especially in the borders of blocks and sometimes inside the block.

As an example, when the mapping at frame level is used the resulting 2D image often looks like the texture of a wooden board.

When using the non-continuous mapping of the first embodiments, the 3D object seems to be flattened into the 2D image. The 2D image is more consistent and closer to the natural image but with some neighbouring lines that seem not exactly aligned.

Whatever the mapping used for a 3D object having an envelope with natural content/colours, the textures contained in the mapped 2D images are usually close to natural images. Conventional codecs for natural content should be preferably used.

For instance, the JPEG format has been designed for natural content.

However, the inventors have surprisingly noticed that coding tools dedicated to artificial contents, such as computer-generated content (e.g. screen shots) provide better encoding results. Based on this finding, the third embodiments propose that the encoding of the mapped 2D image into a sub-bitstream is performed using the Screen Content Coding Extension of an HEVC encoder.

Additional tools have been added to HEVC standard to efficiently encode "screen content" video sequences in addition to natural sequences made of natural content.

The "screen content" video sequences refer to particular video sequences which have a very specific content corresponding to those captured from a personal computer or any other device, containing for example text, PowerPoint presentation, Graphical User Interface, tables (e.g. screen shots). These particular video sequences have quite different statistics compared to natural video sequences.

These dedicated screen content tools, referred to as HEVC SCC standing for HEVC Screen Content Coding, offers a large coding gain for screen content or mixed screen content (screen+natural image).

The trick of the third embodiments is to use such tools, even though the mapped 2D image looks more like a natural content image.

An improvement in coding efficiency has been observed by the inventors for 2D images mapped using the first embodiments above (non-continuous mapping), and with an even better impact when using the second embodiments (continuous mapping).

In one embodiment, the SCC tools are selected according to their importance, as proposed below.

First, the palette mode as defined in HEVC SCC is added to the video codec.

Next, the Intra Block Copy (IBC) coding mode is activated, meaning that the current frame can be used as a reference frame.

Next, the transform Skip tool is implemented, followed by the residual colour transform tool.

Finally, the residual differential pulse code modulation (RDPCM) is enabled.

An exemplary implementation that reduces encoding complexity is to activate only the two first tools (palette and IBC coding modes).

Of course other combinations of tools (even independent of the order above) can be contemplated. In a real time codec, all tool combinations can be evaluated.

One known technic to test a minimum of tool combinations is to test the most probable tool combinations and evaluate their efficiencies to decide whether it is needed to test other combinations or not.

In one illustrative embodiment implementing the second embodiments above (continuous mapping) with a block-based approach, the codec may test at an early stage the screen content tools in order to reduce the encoding time. For instance, the palette and IBC coding modes are tested in an early stage. The advantages of this embodiment include an encoding complexity reduction by a minimum reduction of coding efficiency.

In another illustrative embodiment implementing the first embodiments above (discontinuous mapping) with middle-aligned pixels, when the first and second mapping loops are not block-based (including not truncating the lines), the HEVC range extension is used instead of the HEVC screen content extension in order to save encoding complexity.

Figure 21:
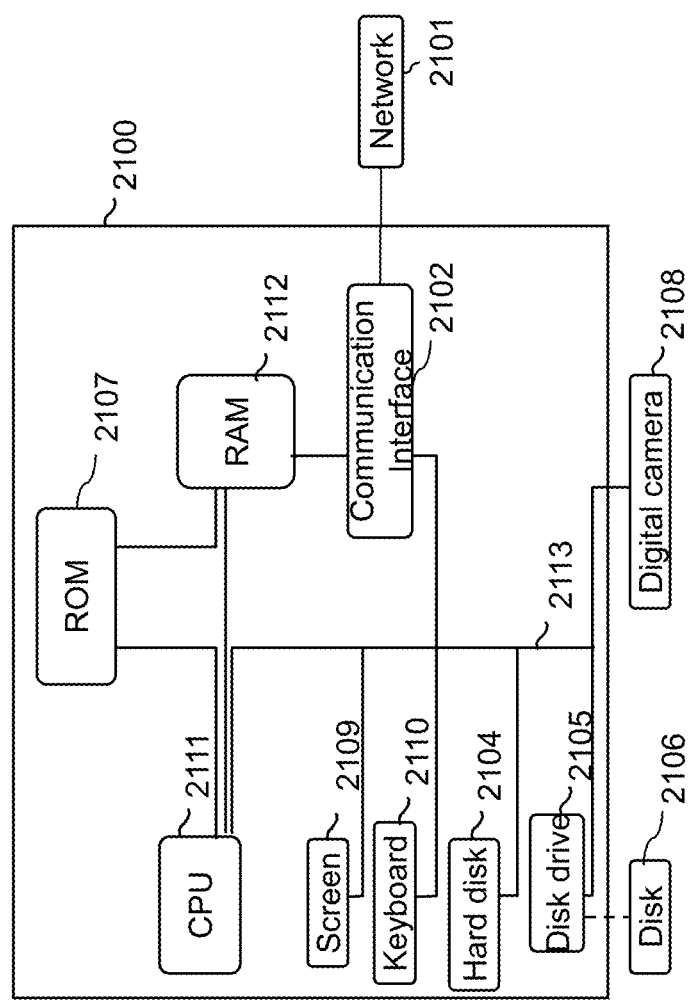
FIG. 21 shows a schematic representation a device in accordance with embodiments of the present invention.

FIG. 21 schematically illustrates a device 2100 to implement at least one embodiment of the present invention. The device 2100 may preferably be a device such as a microcomputer, a workstation or a light portable device. The device 2100 comprises a communication bus 2113 to which there are preferably connected:

- a central processing unit 2111, such as a microprocessor, denoted CPU;
- a read only memory 2107, denoted ROM, for storing computer programs for implementing the invention;
- a random access memory 2112, denoted RAM, for storing the executable code of methods according to embodiments of the invention as well as the registers adapted to record variables and parameters necessary for implementing methods according to embodiments of the invention; and
- at least one communication interface 2102 connected to a communication network 2101 over which data may be transmitted.

Optionally, the device 2100 may also include the following components:

- a data storage means 2104 such as a hard disk, for storing computer programs for implementing methods according to one or more embodiments of the invention;
- a disk drive 2105 for a disk 2106, the disk drive being adapted to read data from the disk 2106 or to write data onto said disk;
- a screen 2109 for displaying data and/or serving as a graphical interface with the user, by means of a keyboard 2110 or any other pointing means.

The device 2100 may be optionally connected to various peripherals, such as for example a digital camera 2108, each being connected to an input/output card (not shown) so as to supply data to the device 2100.

Preferably the communication bus provides communication and interoperability between the various elements included in the device 2100 or connected to it. The representation of the bus is not limiting and in particular the central processing unit is operable to communicate instructions to any element of the device 2100 directly or by means of another element of the device 2100.

The disk 2106 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 2107, on the hard disk 2104 or on a removable digital medium such as for example a disk 2106 as described previously. According to an optional variant, the executable code of the programs can be received by means of the communication network 2101, via the interface 2102, in order to be stored in one of the storage means of the device 2100, such as the hard disk 2104, before being executed.

The central processing unit 2111 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 2104 or in the read only memory 2107, are transferred into the random access memory 2112, which then contains the executable code of the program or programs, as well as registers for storing the variables and parameters necessary for implementing the invention.

In a preferred embodiment, the device is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding, into a bitstream, a three-dimensional model made of a plurality of geometrical entities, including vertices or points or faces or edges, the method comprising the following steps:
   - obtaining a scanning order of geometrical entities within the 3D model,
   - mapping values of a given attribute taken by the geometrical entities respectively, to a 2D image, the attribute value of each geometrical entity being represented by a respective pixel in the 2D image, and
   - encoding, using an image or video encoder, the mapped 2D image into a sub-bitstream,
   - wherein the mapping maps the attribute values successively considered according to the obtained scanning order, to pixels of the 2D image using a raster scan order,
   - wherein an orientation of the raster scan order used to map the values to the 2D image is determined based on an encoding or decoding method used to encode or decode the 2D image resulting from the mapping.

2. The method of claim 1, wherein the raster scan order is a vertical raster scan order.

3. The method of claim 1, wherein the raster scan order is a horizontal raster scan order.

4. The method of claim 1, wherein
   - the 2D image is split into image blocks,
   - the raster scan order is used for said mapping of attribute values to pixels within one or more image blocks of the 2D image, and
   - the image blocks of the 2D image are successively considered for said mapping, using a raster scan order different from the raster scan order used to map attribute values to pixels within each image block.

5. The method of claim 1, wherein the raster scan order is used at image level to map attribute values to pixels.

6. The method of claim 1, wherein the given attribute is a colour attribute defining the colours of the geometrical entities forming the 3D model.

7. The method of claim 1, wherein the raster scan order is selected from a vertical raster scan order and a horizontal raster scan order, based on an encoding method used by the image or video encoder to encode the mapped 2D image or on a decoding method used by the image or video decoder to decode the sub-stream.

8. The method of claim 1, wherein
   - the 3D model is a mesh model composed of triangles,
   - the geometrical entity scanning order includes a parsing order in which vertices composing the 3D mesh model are successively considered to encode or decode connectivity data describing connectivity between the vertices, and
   - the method further comprises:
   - traversing successively each vertex constituting the 3D mesh model; and
   - for each vertex successively traversed, encoding or decoding connectivity data describing connectivity between vertices in the 3D mesh model.

9. A method of decoding, from a bitstream, a three-dimensional model made of a plurality of geometrical entities, including vertices or points or faces or edges, the method comprising the following steps:
obtaining a scanning order of geometrical entities within the 3D model,
decoding, using an image or video decoder, a sub-bitstream into a 2D image, and
mapping pixels forming the 2D image to values of a given attribute taken by the geometrical entities respectively, the attribute value of each geometrical entity being represented by a respective pixel in the 2D image,
wherein the mapping maps the pixels of the 2D image successively considered according to a raster scan order, to attribute values of geometrical entities using the obtained scanning order,
wherein an orientation of the raster scan order used to map the values to the 2D image is determined based on an encoding or decoding method used to encode or decode the 2D image resulting from the mapping.

10. The method of claim 9, wherein the raster scan order is a vertical raster scan order.

11. The method of claim 9, wherein the raster scan order is a horizontal raster scan order.

12. The method of claim 9, wherein
the 2D image is split into image blocks,
the raster scan order is used for said mapping of attribute values to pixels within one or more image blocks of the 2D image, and
the image blocks of the 2D image are successively considered for said mapping, using a raster scan order different from the raster scan order used to map attribute values to pixels within each image block.

13. The method of claim 9, wherein the raster scan order is used at image level to map attribute values to pixels.

14. The method of claim 9, wherein the given attribute is a colour attribute defining the colours of the geometrical entities forming the 3D model.

15. The method of claim 9, wherein the raster scan order is selected from a vertical raster scan order and a horizontal raster scan order, based on an encoding method used by the image or video encoder to encode the mapped 2D image or on a decoding method used by the image or video decoder to decode the sub-stream.

16. The method of claim 9, wherein
the 3D model is a mesh model composed of triangles,
the geometrical entity scanning order includes a parsing order in which vertices composing the 3D mesh model are successively considered to encode or decode connectivity data describing connectivity between the vertices, and
the method further comprises:
traversing successively each vertex constituting the 3D mesh model; and
for each vertex successively traversed, encoding or decoding connectivity data describing connectivity between vertices in the 3D mesh model.

17. A device for encoding, into a bitstream, a three-dimensional model made of a plurality of geometrical entities, including vertices or points or faces or edges, the device comprising at least one microprocessor configured for carrying out the following steps:
obtaining a scanning order of geometrical entities within the 3D model,
mapping values of a given attribute taken by the geometrical entities respectively, to a 2D image, the attribute value of each geometrical entity being represented by a respective pixel in the 2D image, and
encoding, using an image or video encoder, the mapped 2D image into a sub-bitstream,
wherein the mapping maps the attribute values successively considered according to the obtained scanning order, to pixels of the 2D image using a raster scan order,
wherein an orientation of the raster scan order used to map the values to the 2D image is determined based on an encoding or decoding method used to encode or decode the 2D image resulting from the mapping.

18. A device for decoding, from a bitstream, a three-dimensional model made of a plurality of geometrical entities, including vertices or points or faces or edges, the device comprising at least one microprocessor configured for carrying out the following steps:
obtaining a scanning order of geometrical entities within the 3D model,
decoding, using an image or video decoder, a sub-bitstream into a 2D image, and
mapping pixels forming the 2D image to values of a given attribute taken by the geometrical entities respectively, the attribute value of each geometrical entity being represented by a respective pixel in the 2D image,
wherein the mapping maps the pixels of the 2D image successively considered according to a raster scan order, to attribute values of geometrical entities using the obtained scanning order,
wherein an orientation of the raster scan order used to map the values to the 2D image is determined based on an encoding or decoding method used to encode or decode the 2D image resulting from the mapping.

* * * * *